United States Patent
Iwata et al.

(10) Patent No.: US 9,411,256 B2
(45) Date of Patent: Aug. 9, 2016

(54) IMAGE FORMING APPARATUS, IMAGE FORMING METHOD, AND METHOD OF PRODUCING PRINTED MATERIAL FOR GENERATING A PARALLEL LINE DITHER PATTERN OF UNIFORM CONCENTRATION

(71) Applicants: Muneaki Iwata, Kanagawa (JP); Masaaki Ishida, Kanagawa (JP); Atsufumi Omori, Kanagawa (JP); Hayato Fujita, Kanagawa (JP)

(72) Inventors: Muneaki Iwata, Kanagawa (JP); Masaaki Ishida, Kanagawa (JP); Atsufumi Omori, Kanagawa (JP); Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/597,952

(22) Filed: Jan. 15, 2015

(65) Prior Publication Data

US 2015/0125171 A1 May 7, 2015

Related U.S. Application Data

(63) Continuation of application No. 14/268,463, filed on May 2, 2014, now Pat. No. 9,298,122.

(30) Foreign Application Priority Data

May 9, 2013 (JP) ................................ 2013-099497

(51) Int. Cl.
*G03G 15/043* (2006.01)
*H04N 1/40* (2006.01)
(Continued)

(52) U.S. Cl.
CPC ........ *G03G 15/043* (2013.01); *G03G 15/04027* (2013.01); *H04N 1/4058* (2013.01); *H04N 1/40068* (2013.01); *H04N 1/4092* (2013.01)

(58) Field of Classification Search
CPC combination set(s) only.
See application file for complete search history.

(56) References Cited

U.S. PATENT DOCUMENTS

| 5,438,437 | A |   | 8/1995 | Mizoguchi |
| 5,650,858 | A | * | 7/1997 | Lund ............................ 358/3.15 |

(Continued)

FOREIGN PATENT DOCUMENTS

| EP |  1 018 834 | A2 |   | 7/2000 |           |
| JP | 2004-282344 |    | * | 7/2004 | H04N 1/405 |

(Continued)

OTHER PUBLICATIONS

U.S. Appl. No. 14/072,946, filed Nov. 6, 2013.

(Continued)

*Primary Examiner* — Barbara Reinier
(74) *Attorney, Agent, or Firm* — Oblon, McClelland, Maier & Neustadt, L.L.P

(57) ABSTRACT

An image forming apparatus includes: a pseudo-halftone processing unit that processes input image data to output image data of first resolution; a resolution converting unit that converts the image data of the first resolution into image data of second resolution that is higher than the first resolution; a modulation-signal generating unit that generates a modulation signal obtained by modulating the image data of the second resolution according to a clock signal; and a light-source driving unit that drives a light source according to the modulation signal. The pseudo-halftone processing unit converts a region of pixels having the same pixel value into a parallel line pattern that is formed with a plurality of parallel lines oblique relative to a direction of arrangement of pixels. The resolution converting unit generates the image data o in which each edge of the lines forming the parallel line pattern is smoothed.

11 Claims, 24 Drawing Sheets

(51) Int. Cl.
 *H04N 1/405* (2006.01)
 *H04N 1/409* (2006.01)
 *G03G 15/04* (2006.01)

(56) References Cited

U.S. PATENT DOCUMENTS

| | | | |
|---|---|---|---|
| 7,496,121 B2 | 2/2009 | Ishida et al. | |
| 7,724,394 B2 | 5/2010 | Yasutomi | |
| 8,237,760 B2 | 8/2012 | Nihei et al. | |
| 8,310,516 B2 | 11/2012 | Tanabe et al. | |
| 8,553,287 B2 | 10/2013 | Yasutomi | |
| 8,982,422 B2 * | 3/2015 | Iwata | H04N 1/40037 347/135 |
| 9,298,122 B2 * | 3/2016 | Iwata | G03G 15/043 |
| 2003/0025785 A1 | 2/2003 | Nihei et al. | |
| 2005/0088697 A1 * | 4/2005 | Yasutomi | G06K 15/1223 358/2.1 |
| 2005/0089069 A1 | 4/2005 | Ozasa et al. | |
| 2005/0146596 A1 | 7/2005 | Nihei et al. | |
| 2005/0243163 A1 | 11/2005 | Ozasa et al. | |
| 2006/0285186 A1 | 12/2006 | Ishida et al. | |
| 2007/0091163 A1 | 4/2007 | Omori et al. | |
| 2007/0132828 A1 | 6/2007 | Ishida et al. | |
| 2007/0166077 A1 * | 7/2007 | Inoue | G03G 15/0115 399/227 |
| 2008/0088893 A1 | 4/2008 | Ishida et al. | |
| 2008/0123160 A1 | 5/2008 | Omori et al. | |
| 2008/0225106 A1 | 9/2008 | Omori et al. | |
| 2008/0239336 A1 | 10/2008 | Tanabe et al. | |
| 2008/0291259 A1 | 11/2008 | Nihei et al. | |
| 2008/0298842 A1 | 12/2008 | Ishida et al. | |
| 2009/0303451 A1 | 12/2009 | Miyake et al. | |
| 2010/0214637 A1 | 8/2010 | Nihei et al. | |
| 2011/0199657 A1 | 8/2011 | Ishida et al. | |
| 2011/0228037 A1 | 9/2011 | Omori et al. | |
| 2011/0304683 A1 | 12/2011 | Ishida et al. | |
| 2012/0099165 A1 | 4/2012 | Omori et al. | |
| 2012/0120454 A1 | 5/2012 | Igawa | |
| 2012/0189328 A1 | 7/2012 | Suzuki et al. | |
| 2012/0293783 A1 | 11/2012 | Ishida et al. | |
| 2013/0033558 A1 | 2/2013 | Akatsu et al. | |
| 2013/0215436 A1 * | 8/2013 | Genda | G06K 15/1869 358/1.2 |
| 2013/0243459 A1 | 9/2013 | Omori et al. | |
| 2013/0265615 A1 | 10/2013 | Nakashima | |
| 2013/0302052 A1 | 11/2013 | Iwata et al. | |
| 2014/0268186 A1 * | 9/2014 | Iwata | G06K 15/1873 358/1.2 |
| 2014/0333941 A1 * | 11/2014 | Iwata | H04N 1/40037 358/1.1 |
| 2016/0012322 A1 * | 1/2016 | Iwata | G06K 15/1874 358/1.2 |

FOREIGN PATENT DOCUMENTS

| | | |
|---|---|---|
| JP | 2004-282344 | 10/2004 |
| JP | 4026271 | 10/2007 |
| JP | 4912071 | 1/2012 |

OTHER PUBLICATIONS

U.S. Appl. No. 14/082,628, filed Nov. 18, 2013.
U.S. Appl. No. 14/140,147, filed Dec. 24, 2013.
U.S. Appl. No. 14/193,271, filed Feb. 28, 2014.
Extended Search Report issued Nov. 12, 2014 in European Patent Application No. 14167402.8-1903.
Notice of Allowance Issued in related U.S. Appl. No. 14/268,463, dated Dec. 1, 2015. (9 pages).

* cited by examiner 1200 dpi (A) 1200 dpi — EDGE PATTERN (UPPER SIDE)

(B) 4800 dpi — SMOOTH PATTERN (UPPER SIDE)

REPLACE (A) 1200 dpi — EDGE PATTERN (LOWER SIDE)

(B) 4800 dpi — SMOOTH PATTERN (LOWER SIDE)

REPLACE

IMAGE FORMING APPARATUS, IMAGE FORMING METHOD, AND METHOD OF PRODUCING PRINTED MATERIAL FOR GENERATING A PARALLEL LINE DITHER PATTERN OF UNIFORM CONCENTRATION

CROSS-REFERENCE TO RELATED APPLICATIONS

The present continuation application claims the benefit of priority under 35 U.S.C. 120 to application Ser. No. 14/268,463, filed on May 2, 2014, and claims the benefit of priority under 35 U.S.C. 119 from Japanese Patent Application No. 2013-099497 filed in Japan on May 9, 2013, the entire contents of which are incorporated herein by reference.

BACKGROUND OF THE INVENTION

1. Field of the Invention

The present invention relates to an image forming apparatus, an image forming method, and a method of producing a printed material.

2. Description of the Related Art

Recently, digital printing machines applying an electrophotographic process are increasingly used in a production printing industry. Therefore, higher image quality and higher credibility are demanded of the digital printing machines applying the electrophotographic process. Particularly, improvement of uniformity in concentration of a halftone is strongly demanded of the digital printing machines.

For the purpose of achieving high image quality, the digital printing machines applying the electrophotographic process are equipped with an image processing unit that corrects image data by image processing. This image processing unit performs the image processing with multiple-bit data at high resolution of, for example, 1200 dots per inch (dpi) or 2400 dpi.

Moreover, the digital printing machine applying the electrophotographic process includes a photosensitive drum a surface of which functions as a photosensitive surface to be scanned, a light source that emits a laser beam, a polygon mirror that deflects the laser beam from the light source, a scanning optical system that guides the laser beam deflected by the polygon mirror to the surface of the photosensitive drum (surface to be scanned), and the like. The digital printing machine applying the electrophotographic process modulates a beam emitted from the light source based on image data, and irradiates the beam from the light source on the surface to be scanned, to scan the surface to be scanned with the beam, thereby forming an electrostatic latent image according to the image data on the photosensitive drum.

The digital printing machine applying the electrophotographic process having such a configuration uses a device that has multiple light emitting points such as a laser diode array (LDA) and a vertical cavity surface emitting laser (VCSEL). Thus, the digital printing machine applying the electrophotographic process can form an electrostatic latent image with resolution of, for example, 2400 dpi or 4800 dpi that is higher than that of the image data at 1200 dpi.

Furthermore, in the digital printing machine, parallel line dithering in which a region having uniform concentration (that is, a region of pixels having the same pixel value) in image data is replaced with a parallel line pattern is performed in some cases as a pseudo-halftone processing. The parallel line pattern expresses concentration in surface by changing each line width according to an original pixel value.

For example, in a technique described in Japanese Laid-open Patent Publication No. 2004-282344, resolution of a binary parallel line pattern generated by performing a pseudo-halftone processing in an image processing unit is increased and then interpolation and smoothing are performed, thereby suppressing roughness without changing the number of lines. In a technique disclosed in Japanese Patent No. 4026271, pixels are divided by small regions and resolution thereof is increased, and smoothing is performed on an edge portion of an image, to obtain high image quality.

When an electrostatic latent image of a parallel line pattern is formed on a photosensitive drum, if a distances between lines is short, a shape, an electric-field intensity distribution, and the like of the electrostatic latent image corresponding to one line are influenced by an adjacent electrostatic latent image. Particularly, if line intervals are short, a low electric-field intensity area in which adhesion of toner is unstable is generated. Therefore, in a digital printing machine, when the parallel line dithering is performed, it is preferable that the electric field intensity of a latent image of each line be equal to or higher than a threshold to keep a certain intensity at any position on the line, to make the concentration of an output image uniform.

However, in a parallel line pattern of low-resolution image data, an edge of each line has a rough stepped-shape. Because of this, in a parallel line pattern of low-resolution image data, distances between lines vary depending on positions of the lines, and influence of a latent image corresponding to an adjacent line varies, and therefore, an area in which the electric field intensity is partially low is generated. As a result, toner can adhere non-uniformly, or toner scattering can occur between lines. Accordingly, for the digital printing machine, it has been difficult to obtain uniform concentration when the parallel line dithering is performed on low-resolution image data.

To solve this problem, it is necessary to perform the parallel line dithering on higher-resolution image data in the digital printing machine. However, if the parallel line dithering is performed on higher-resolution image data, the amount of data to be transferred from the pseudo-halftone processing unit to a light-source driving circuit positioned downstream increases, and thus limiting productivity.

In view of the above, there is a need to provide an image forming apparatus, an image forming method, and a method of producing a printed material that can make concentration of a parallel line pattern uniform.

SUMMARY OF THE INVENTION

It is an object of the present invention to at least partially solve the problems in the conventional technology.

An image forming apparatus forms an image according to light emitted from a light source. The image forming apparatus includes: a pseudo-halftone processing unit that processes input image data to output image data of first resolution; a resolution converting unit that converts the image data of the first resolution into image data of second resolution that is higher than the first resolution; a modulation-signal generating unit that generates a modulation signal obtained by modulating the image data of the second resolution according to a clock signal; and a light-source driving unit that drives the light source according to the modulation signal. The pseudo-halftone processing unit converts a region of pixels having the same pixel value in the input image data into a parallel line pattern that is formed with a plurality of parallel lines oblique relative to a direction of arrangement of pixels to express concentration by an area ratio. The resolution converting unit generates the image data of the second resolution in which each edge of the lines forming the parallel line pattern is smoothed.

An image forming method forms an image according to light emitted from a light source. The image forming method includes: a pseudo-halftone processing step of processing input image data to output image data of first resolution; a resolution converting step of converting the image data of the first resolution into image data of second resolution that is higher than the first resolution; a modulation-signal generating step of generating a modulation signal obtained by modulating the image data of the second resolution according to a clock signal; and a light-source driving step of driving the light source according to the modulation signal. At the pseudo-halftone processing step, a region of pixels having the same pixel value in the input image data is converted into a parallel line pattern that is formed with a plurality of parallel lines oblique relative to a direction of arrangement of pixels to express concentration by an area ratio. At the resolution converting step, the image data of the second resolution in which each edge of the lines forming the parallel line pattern is smoothed is generated.

A method produces a printed material. The method includes: a pseudo-halftone processing step of processing input image data to output image data of first resolution; a resolution converting step of converting the image data of the first resolution into image data of second resolution that is higher than the first resolution; a modulation-signal generating step of generating a modulation signal obtained by modulating the image data of the second resolution according to a clock signal; an electrostatic-latent-image forming step of forming, on a latent image carrier, an electrostatic latent image by light emitted from a light source by driving the light source according to the modulation signal; an adhesion step of making toner adhere to the electrostatic latent image that is formed on the latent image carrier; and a transfer step of transferring the toner onto an object to produce a printed material. At the pseudo-halftone processing step, a region of pixels having the same pixel value in the input image data is converted into a parallel line pattern that is formed with a plurality of parallel lines oblique relative to a direction of arrangement of pixels to express concentration by an area ratio. At the resolution converting step, the image data of the second resolution in which each edge of the lines forming the parallel line pattern is smoothed is generated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A color printer 2000 is explained in detail as an example of an image forming apparatus that is an embodiment of the present invention with reference to the accompanying drawings.

Figure 1:
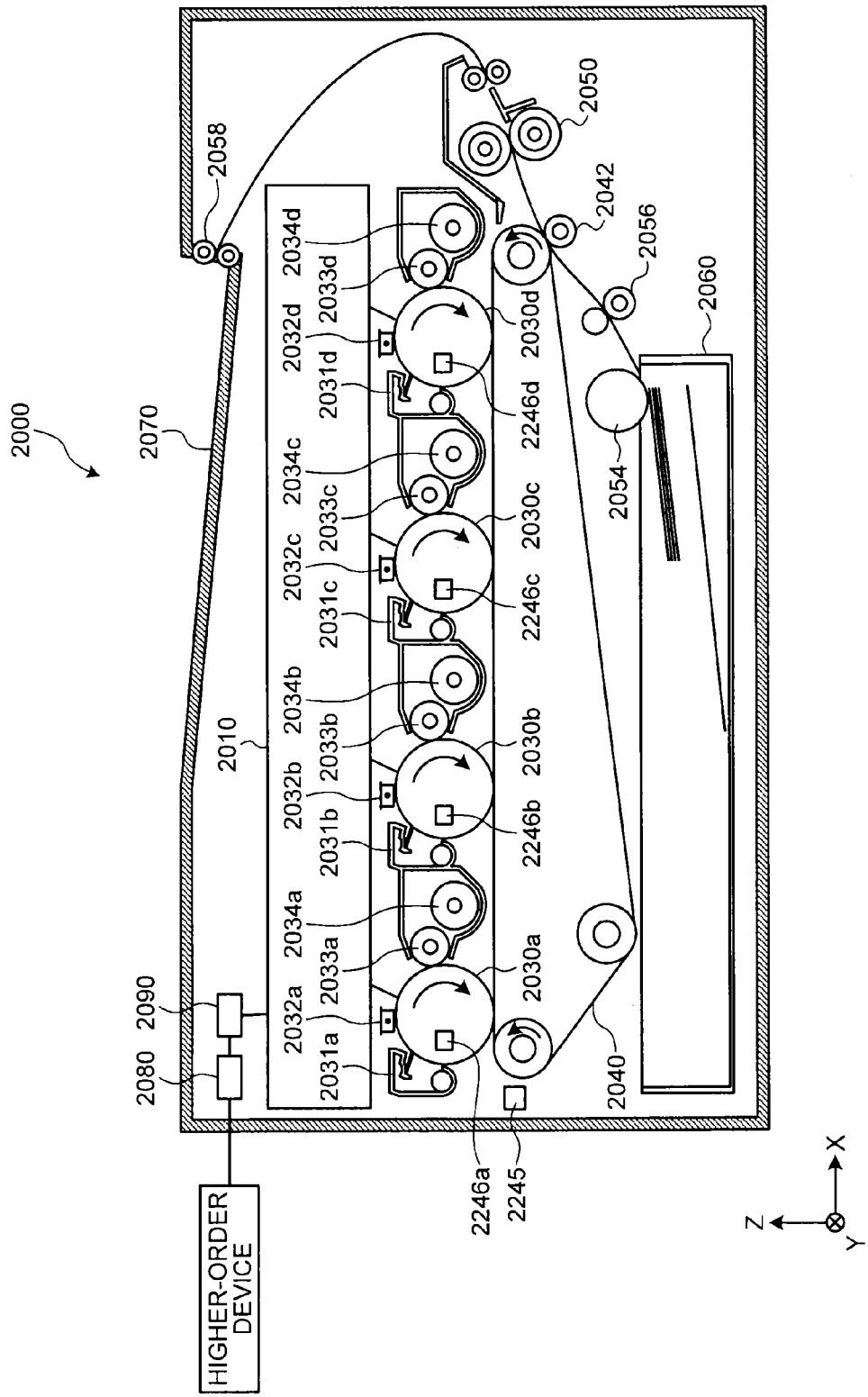
FIG. 1 is a schematic configuration diagram of a color printer 2000 according to an embodiment.

FIG. 1 is a schematic configuration diagram of the color printer 2000 according to the embodiment. The color printer 2000 produces a printed material by transferring toner onto recording paper (object). The color printer 2000 is a tandem-system multi-color printer that forms a full-color image by superimposing four colors (black, cyan, magenta, and yellow).

The color printer 2000 includes an optical scanning device 2010, four units of photosensitive drums 2030a, 2030b, 2030c, 2030d (described as photosensitive drum 2030 when the four units are collectively described), four units of cleaning units 2031a, 2031b, 2031c, 2031d (described as cleaning unit 2031 when the four units are collectively described), and four units of charge devices 2032a, 2032b, 2032c, 2032d (described as charge device 2032 when the four units are collectively described). Furthermore, the color printer 2000 includes four units of developing rollers 2033a, 2033b, 2033c, 2033d (described as developing roller 2033 when the four units are collectively described), four units of toner cartridges 2034a, 2034b, 2034c, 2034d (described as toner cartridge 2034 when the four units are collectively described). Moreover, the color printer 2000 includes a transfer belt 2040, a transfer roller 2042, a fixing roller 2050, a paper feeding roller 2054, a registration roller pair 2056, a paper ejection roller 2058, a paper feeding tray 2060, a paper ejection tray 2070, a communication control device 2280, a concentration detector 2245, four units of home position sensors 2246a, 2246b, 2246c, 2246d (described as home position sensor 2246 when the four units are collectively described), and a printer control device 2090.

The communication control device 2080 controls interactive communication with a higher-order device (for example, a computer) through a network and the like.

The printer control device 2090 performs overall control of the respective components equipped in the color printer 2000. The printer control device 2090 includes a central processing unit (CPU), a read-only memory (ROM) in which a program that is described in a code used by the CPU and various kinds of data that are used when the program is executed, a random access memory (RAM) that is a memory for operation, an analog-to-digital (A/D) converter circuit that converts analog data to digital data, and the like. The printer control device 2090 controls the respective components according to a request from a higher-order device, and transmits image data received from a higher-order device to the optical scanning device 2010.

The photosensitive drum 2030a, the charge device 2032a, the developing roller 2033a, the toner cartridge 2034a, and the cleaning unit 2031a are used in a group. These units form an image forming station that forms black images (also called K station).

The photosensitive drum 2030b, the charge device 2032b, the developing roller 2033b, the toner cartridge 2034b, and the cleaning unit 2031b are used in a group. These units form an image forming station that forms cyan images (also called C station).

The photosensitive drum 2030c, the charge device 2032c, the developing roller 2033c, the toner cartridge 2034c, and the cleaning unit 2031c are used in a group. These units form an image forming station that forms magenta images (also called M station).

The photosensitive drum 2030d, the charge device 2032d, the developing roller 2033d, the toner cartridge 2034d, and the cleaning unit 2031d are used in a group, and forms an image forming station that forms yellow images (also called Y station).

Each of the photosensitive drums 2030 is an example of a latent image carrier and has a photosensitive layer on a surface thereof. That is, the surface of each of the photosensitive drums 2030 is a surface to be scanned. The photosensitive drums 2030a, 2030b, 2030c, 2030d are arranged such that rotation axes are aligned parallel, and for example, rotated all in an identical direction (for example, a direction of an arrow in the plane of FIG. 1).

In the explanation herein, in a three-dimensional orthogonal coordinate system, a direction parallel to a center axis of each of the photosensitive drums 2030 is a Y-axis direction, and a direction along a direction of alignment of the respective photosensitive drums 2030 is an X-axis direction.

Each of the charge devices 2032 uniformly charges the surface of the corresponding photosensitive drums 2030. The optical scanning device 2010 irradiates beams that are modulated for respective colors based on image data (black image data, cyan image data, magenta image data, and yellow image data) to the charged surfaces of the corresponding photosensitive drums 2030. Thus, on the surfaces of the respective photosensitive drums 2030, only a part on which light is irradiated loses an electric charge, and latent images corresponding to the image data are formed on the surfaces of the respective photosensitive drums 2030. The latent images formed herein are transferred toward a direction of the corresponding developing rollers 2033 with rotation of the photosensitive drums 2030. A configuration of the optical scanning device 2010 is described in detail later.

On each of the photosensitive drums 2030, an area in which image data is written is called an "effective scanning area", an "image forming area", an "effective image area", or the like.

In the toner cartridge 2034a, black toner is stored, and the black toner is supplied to the developing roller 2033a. In the toner cartridge 2034b, cyan toner is stored, and the cyan toner is supplied to the developing roller 2033b. In the toner cartridge 2034c, magenta toner is stored, and the magenta toner is supplied to the developing roller 2033c. In the toner cartridge 2034d, yellow toner is stored, and the yellow toner is supplied to the developing roller 2033d.

To each of the developing rollers 2033, toner from a corresponding toner cartridge 2034 is thinly and uniformly applied on the surface with rotation. When the toner on the surface of each of the developing rollers 2033 touches the surface of the corresponding photosensitive drum 2030, the toner is transferred only to the part on which light has been irradiated on the surface, and adheres thereto. That is, each of the developing rollers 2033 makes toner adhere to a latent image formed on the surface of the corresponding photosensitive drum 2030 to make the image appear.

The transfer belt 2040 is arranged around a belt rotating mechanism, and rotates in a predetermined direction. An outer surface of the transfer belt 2040 comes into contact with the surface of each of the photosensitive drums 2030a, 2030b, 2030c, 2030d, at a position opposite to the optical scanning device 2010. Moreover, the transfer belt 2040 comes into contact with the transfer roller 2042 at the outer surface thereof.

The images (toner images) to which toner has adhered on the surfaces of the respective photosensitive drums 2030 are transferred toward a direction of the transfer belt 2040 with rotation of the photosensitive drums 2030. The respective toner images of yellow, magenta, cyan, and black are sequentially transferred onto the transfer belt 2040 at predetermined timing to be superimposed, to form a color image. The color image formed on the transfer belt 2040 moves toward a direction of the transfer roller 2042 as the transfer belt 2040 moves.

In the paper feeding tray 2060, recording paper is stored. The paper feeding roller 2054 is arranged near the paper feeding tray 2060, and the paper feeding roller 2054 takes out the recording paper one by one from the paper feeding tray 2060, and conveys to the registration roller pair 2056.

The registration roller pair 2056 sends the recording paper into a gap between the transfer belt 2040 and the transfer roller 2042 at predetermined timing. Thus, the color image on the transfer belt 2040 is transferred onto the recording paper. The recording paper to which the image has been transferred is sent to the fixing roller 2050.

The fixing roller 2050 applies heat and pressure to the recording paper, and thus the toner is fixed onto the recording paper. The recording paper on which the toner is thus fixed is sent to the paper ejection tray 2070 through the paper ejection roller 2058, and is sequentially stacked on the paper ejection tray 2070.

Each of the cleaning units 2031 removes toner (residual toner) remaining on the surface of the corresponding photosensitive drum 2030. The surface of the photosensitive drum 2030 from which the residual toner has been removed returns to a position opposing to the corresponding charge device 2032 again.

Figure 2:
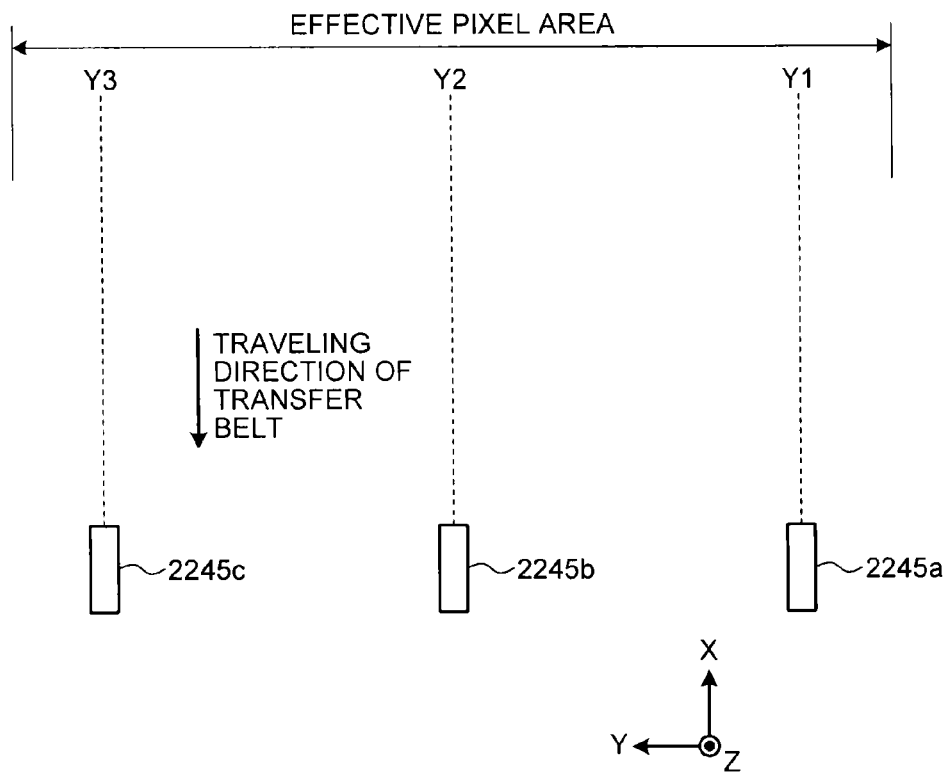
FIG. 2 is a diagram showing an example of arrangement of optical sensors 2245a 2245b, 2245c.

A concentration detector 2245 is arranged on a −X side of the transfer belt 2040 (a position on an upstream side in a direction of travel of the transfer belt 2040 relative to the fixing roller 2050, and on a downstream side relative to the four units of the photosensitive drums 2030). The concentration detector 2245 includes three optical sensors 2245a, 2245b, and 2245c as shown in FIG. 2 as an example.

The optical sensor 2245a is arranged at a position opposing to a portion adjacent to a −Y side end (one end side in a direction of width of the transfer belt 2040) in the effective image area on the transfer belt 2040. The optical sensor 2245c is arranged at a position opposing to a portion adjacent to a +Y side end (the other end in the direction of width of the transfer belt 2040) in the effective image area on the transfer belt 2040. The optical sensor 2245b is arranged at an approximately center (a center position in the direction of width of the transfer belt 2040) between the optical sensor 2245a and the optical sensor 2245c relative to a main scanning direction. Herein, a center position of the optical sensor 2254a is Y1, a center position of the optical sensor 2245b is Y2, and a center position of the optical sensor 2245c is Y3 relative to the main scanning direction (Y-axis direction).

Figure 3:
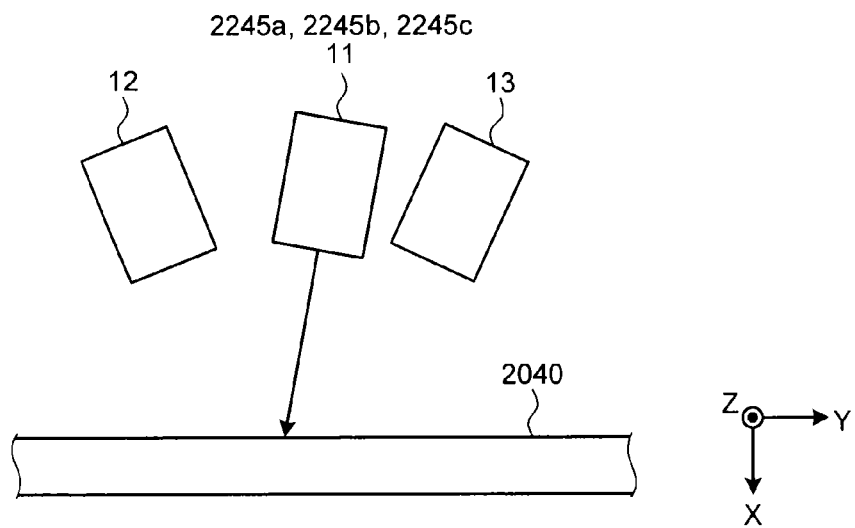
FIG. 3 is a configuration diagram of the optical sensors 2245a 2245b, 2245c.

Each of the optical sensors 2245a, 2245b, 2245c has a light-emitting diode (LED) 11 that emits light (hereinafter, described also as "detection light") toward the transfer belt 2040, a specular-reflection-light receiving element 12 that receives specular reflection light from the transfer belt 2040 or a toner pad on the transfer belt 2040, a diffused-reflection-light receiving element 13 that receives diffused reflection light from the transfer belt 2040 or a toner pad on the transfer belt 2040 as shown in FIG. 3 as an example. Each of the light receiving elements outputs a signal (photoelectrical conversion signal) according to an amount of received light.

The home position sensor 2246a detects a home position in rotation of the photosensitive drum 2030a. The home position sensor 2246b detects a home position in rotation of the photosensitive drum 2030b. The home position sensor 2246c detects a home position in rotation of the photosensitive drum 2030c. The home position sensor 2246d detects a home position in rotation of the photosensitive drum 2030d.

Figure 4:
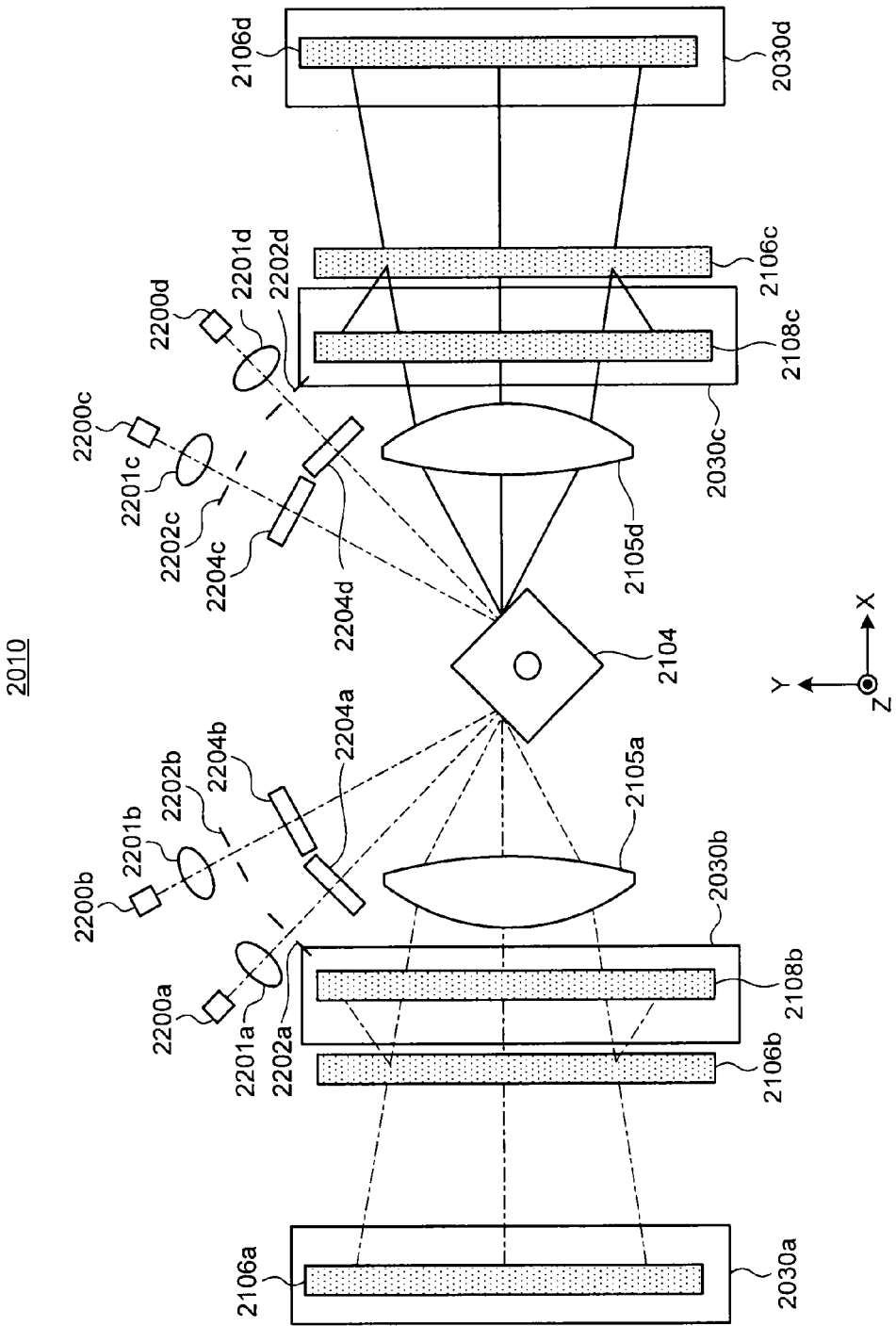
FIG. 4 is a configuration diagram of an optical system of an optical scanning device 2010.
Figure 5:
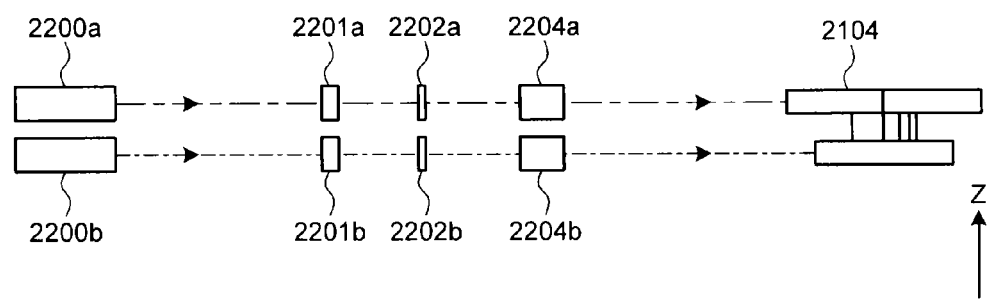
FIG. 5 is a diagram showing an example of an optical path from a light source 2200a to a polygon mirror 2104 and an optical path from a light source 2200b to the polygon mirror 2104.
Figure 6:
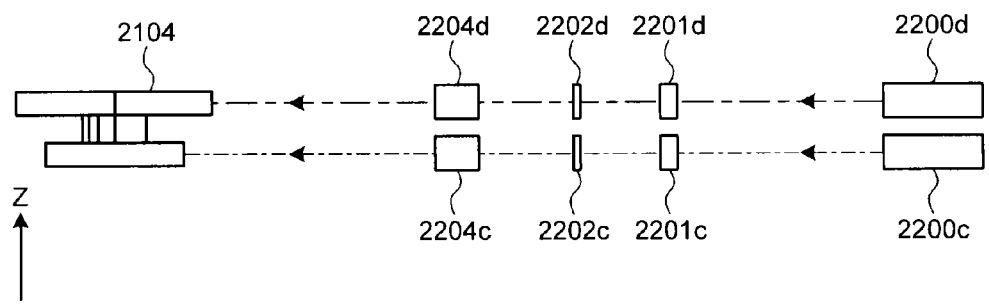
FIG. 6 is a diagram showing an example of an optical path from a light source 2200c to the polygon mirror 2104 and an optical path from a light source 2200d to the polygon mirror 2104.
Figure 7:
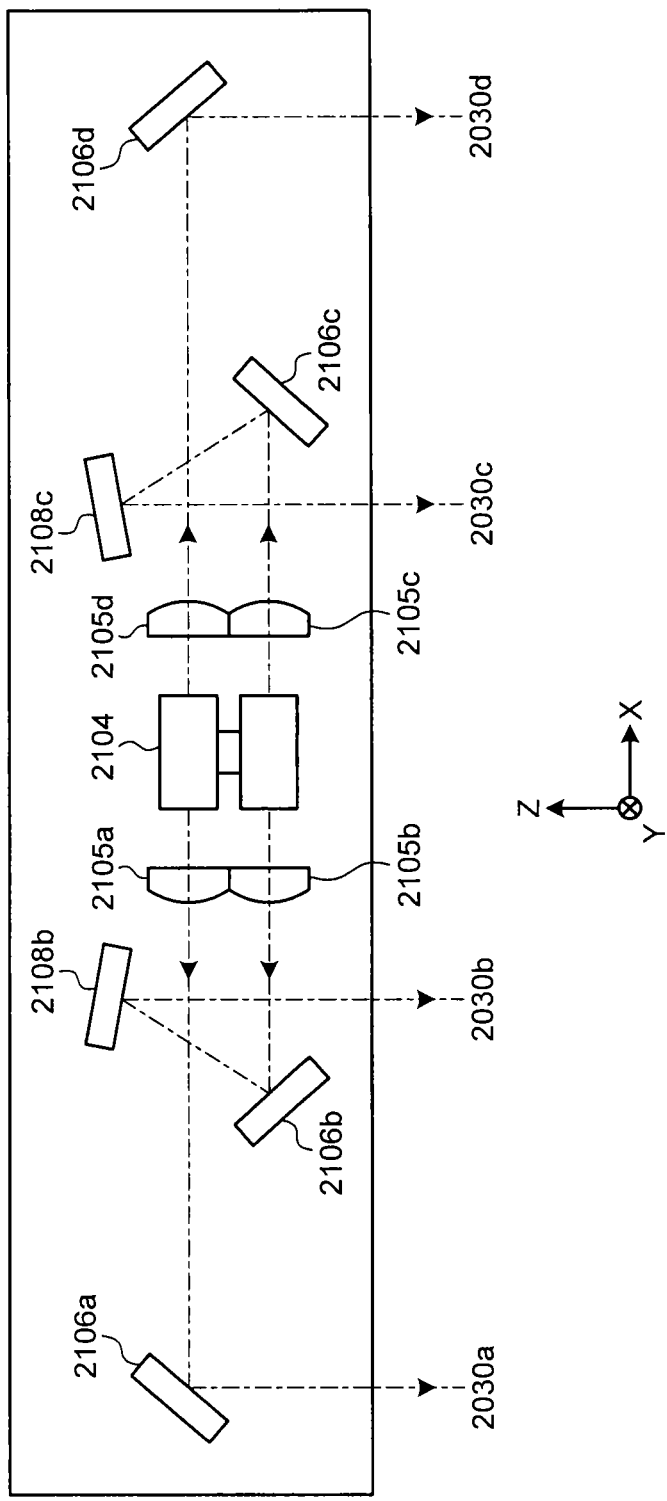
FIG. 7 is a diagram showing an example of optical paths from the polygon mirror 2104 to respective photosensitive drums 2030.

FIG. 4 is a configuration diagram of an optical system the optical scanning device 2010. FIG. 5 is a diagram showing an example of an optical path from a light source 2200a to a polygon mirror 2104 and an optical path from a light source 2200b to the polygon mirror 2104. FIG. 6 is a diagram showing an example of an optical path from a light source 2200c to the polygon mirror 2104 and an optical path from a light source 2200d to the polygon mirror 2104. FIG. 7 is a diagram showing an example of optical paths from the polygon mirror 2104 to the respective photosensitive drums 2030.

Next, a configuration of the optical system of the optical scanning device 2010 is explained. The optical scanning device 2010 includes four units of the light sources 2200a, 2200b, 2200c, 2200d, four units of coupling lenses 2201a, 2201b, 2201c, 2201d, four units of opening plates 2202a, 2202b, 2202c, 2202d, and four units of cylindrical lenses 2204a, 2204b, 2204c, 2204d as the optical system. Furthermore, the optical scanning device 2010 includes the polygon mirror 2104, four units of scanning lenses 2105a, 2105b, 2105c, 2105d, six pieces of fold back mirrors 2106a, 2106b, 2106c, 2106d, 2108b, 2108c as the optical system. These components are assembled at predetermined positions in an optical housing.

Moreover, the optical scanning device 2010 also has a circuit of an electric system, and the circuit of the electric system is explained in FIG. 8 and later.

Each of the light sources 2200a, 2200b, 2200c, 2200d includes a surface-emitting laser array in which multiple light emitting units are two-dimensionally arranged. The light emitting units of the surface-emitting laser array are arranged such that the intervals between the light emitting units are equal when all of the light emitting units orthogonally project on a virtual line that extends in a sub-scanning support direction. Each of the light sources 2200a, 2200b, 2200c, 2200d is a VCSEL, as an example.

The coupling lens 2201a is arranged on an optical path of the beam emitted from the light source 2200a, and converts the beam passing therethrough into an approximately parallel beam. The coupling lens 2201b is arranged on an optical path of the beam emitted from the light source 2200b, and converts the beam passing therethrough into an approximately parallel beam. The coupling lens 2201c is arranged on an optical path of the beam emitted from the light source 2200c, and converts the beam passing therethrough into an approximately parallel beam. The coupling lens 2201d is arranged on an optical path of the beam emitted from the light source 2200d, and converts the beam passing therethrough into an approximately parallel beam.

The opening plate 2202a has an opening, and shapes the beam through the coupling lens 2201a. The opening plate 2202b has an opening, and shapes the beam through the coupling lens 2201b. The opening plate 2202c has an opening, and shapes the beam through the coupling lens 2201c. The opening plate 2202d has an opening, and shapes the beam through the coupling lens 2201d.

The cylindrical lens 2204a makes the beam that has passed through the opening of the opening plate 2202a form an image near a deflection reflection surface of the polygon mirror 2104 relative to a Z-axis direction. The cylindrical lens 2204b makes the beam that has passed through the opening of the opening plate 2202b form an image near the deflection reflection surface of the polygon mirror 2104 relative to the Z-axis direction. The cylindrical lens 2204c makes the beam that has passed through the opening of the opening plate 2202c form an image near the deflection reflection surface of the polygon mirror 2104 relative to the Z-axis direction. The cylindrical lens 2204d makes the beam that has passed through the opening of the opening plate 2202d form an image near the deflection reflection surface of the polygon mirror 2104 relative to the Z-axis direction.

An optical system constituted of the coupling lens 2201a, the opening plate 2202a, and the cylindrical lens 2204a is a pre-deflector optical system of the K station. An optical system constituted of the coupling lens 2201b, the opening plate 2202b, and the cylindrical lens 2204b is a pre-deflector optical system of the C station. An optical system constituted of the coupling lens 2201c, the opening plate 2202c, and the cylindrical lens 2204c is a pre-deflector optical system of the M station. An optical system constituted of the coupling lens 2201d, the opening plate 2202d, and the cylindrical lens 2204d is a pre-deflector optical system of the Y station.

The polygon mirror 2104 has a four-sided mirror having a two-stage structure that rotates about an axis parallel to the Z axis, and each mirror functions as a deflection reflection surface. It is arranged such that each of the beam from the cylindrical lens 2204b and the beam from the cylindrical lens 2204c is deflected at the four-sided mirror at a first stage (lower stage), and each of the beam from the cylindrical lens 2204a and the beam from the cylindrical lens 2204d is deflected at the four-sided mirror at a second stage (upper stage).

Moreover, each of the beams from the cylindrical lens 2204a and the cylindrical lens 2204b is deflected toward the −X side of the polygon mirror 2104, and each of the beams from the cylindrical lens 2204c and the cylindrical lens 2204d is deflected toward a +X side of the polygon mirror 2104.

Each of the scanning lenses 2105a, 2105b, 2105c, 2105d has an optical power to collect beams near the corresponding photosensitive drum 2030, and an optical power that a light spot moves in the main scanning direction at a constant speed on a surface of the corresponding photosensitive drum 2030 with rotation of the polygon mirror 2104.

The scanning lens 2105a and the scanning lens 2105b are arranged on the −X side of the polygon mirror 2104, and the scanning lens 2105c and the scanning lens 2105d are arranged on the +X side of the polygon mirror 2104.

The scanning lens 2105a and the scanning lens 2105b are layered in the Z-axis direction. The scanning lens 2105b is opposed to the four-sided mirror at the first stage. The scanning lens 2105a is opposed to the four-sided mirror at the second stage.

Furthermore, the scanning lens 2105c and the scanning lens 2105d are layered in the Z-axis direction. The scanning lens 2105c is opposed to the four-sided mirror at the first stage. The scanning lens 2105d is opposed to the four-sided mirror at the second stage.

The beam from the cylindrical lens 2204a deflected by the polygon mirror 2104 is irradiated to the photosensitive drum 2030a through the scanning lens 2105a and the fold back mirror 2106a, to form a light spot. This light spot moves in the direction of length of the photosensitive drum 2030a with rotation of the polygon mirror 2104. That is, this light spot scans on the photosensitive drum 2030a. The direction of movement of this light spot at this time is the "main scanning direction" at the photosensitive drum 2030a, and the direction of rotation of the photosensitive drum 2030a is the "sub-scanning direction" at the photosensitive drum 2030a.

Moreover, the beam from the cylindrical lens 2204b deflected by the polygon mirror 2104 is irradiated to the photosensitive drum 2030b through the scanning lens 2105b, the fold back mirror 2106b, and the fold back mirror 2108b, to form a light spot. This light spot moves in the direction of length of the photosensitive drum 2030b with rotation of the polygon mirror 2104. That is, this light spot scans on the photosensitive drum 2030b. The direction of movement of this light spot at this time is the "main scanning direction" at the photosensitive drum 2030b, and the direction of rotation of the photosensitive drum 2030b is the "sub-scanning direction" at the photosensitive drum 2030b.

Furthermore, the beam from the cylindrical lens 2204c deflected by the polygon mirror 2104 is irradiated to the photosensitive drum 2030c through the scanning lens 2105c, the fold back mirror 2106c, and the fold back mirror 2108c, to form a light spot. This light spot moves in the direction of length of the photosensitive drum 2030c with rotation of the polygon mirror 2104. That is, this light spot scans on the photosensitive drum 2030c. The direction of movement of this light spot at this time is the "main scanning direction" at the photosensitive drum 2030c, and the direction of rotation of the photosensitive drum 2030c is the "sub-scanning direction" at the photosensitive drum 2030c.

Moreover, the beam from the cylindrical lens 2204d deflected by the polygon mirror 2104 is irradiated to the photosensitive drum 2030d through the scanning lens 2105d and the fold back mirror 2106d, to form a light spot. This light spot moves in the direction of length of the photosensitive drum 2030d with rotation of the polygon mirror 2104. That is, this light spot scans on the photosensitive drum 2030d. The direction of movement of this light spot at this time is the "main scanning direction" at the photosensitive drum 2030d, and the direction of rotation of the photosensitive drum 2030d is the "sub-scanning direction" at the photosensitive drum 2030d.

The respective fold back mirrors 2106a, 2106b, 2106c, 2106d, 2108b, 2108c are arranged such that the respective optical path lengths to the respective photosensitive drums 2030 from the polygon mirror 2104 are identical to each other, and such that incident positions and incident angles of beams at the respective photosensitive drums 2030 are identical to each other.

The optical system arranged on the optical path between the polygon mirror 2104 and each of the photosensitive drums 2030 is also called a scanning optical system. In this example, the scanning optical system of the K station is constituted of the scanning lens 2105a and the fold back mirror 2106a. Moreover, the scanning optical system of the C station is constituted of the scanning lens 2105b and two pieces of the fold back mirrors 2106b, 2108b. Further, the scanning optical system of the M station is constituted of the scanning lens 2105c and two pieces of the fold back mirrors 2106c, 2108c. Furthermore, the scanning optical system of the Y station is constituted of the scanning lens 2105d and the fold back mirror 2106d. In each of the scanning optical systems, the scanning lens 2105 may be configured with more than one lens.

Figure 8:
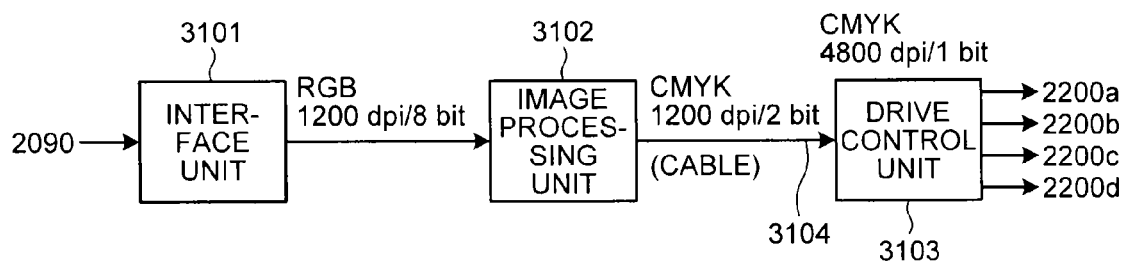
FIG. 8 is a configuration diagram of an electric system of the optical scanning device 2010.

FIG. 8 is a configuration diagram of the electric system of the optical scanning device 2010. The optical scanning device 2010 includes an interface unit 3101, an image processing unit 3102, and a drive control unit 3103, as components of the electric system.

The interface unit 3101 acquires image data that has been transferred from a higher-order device (for example, a computer), from the printer control device 2090. The interface unit 3101 then transfers the acquired image data to the image processing unit 3102 positioned at a subsequent stage.

In this example, the interface unit 3101 acquires 8-bit RGB image data having resolution of 1200 dpi and transfers the data to the image processing unit 3102.

The image processing unit 3102 acquires image data from the interface unit 3101, and converts the image data into color image data that is compatible with the printing mode. As an example, the image processing unit 3102 converts RGB image data into image data in a tandem format (CMYK format). Furthermore, the image processing unit 3102 performs various kinds of image processing in addition to the conversion of data format.

In this example, the image processing unit 3102 outputs 2-bit CMYK image data having resolution of 1200 dpi. The resolution of image data output from the image processing unit 3102 is not limited to 1200 dpi, and any resolution is applicable. Moreover, the resolution of image data output from the image processing unit 3102 is referred to as first resolution.

The drive control unit 3103 acquires the image data of the first resolution from the image processing unit 3102, and converts the image data into color image data of second resolution corresponding to driving of the light source. The second resolution is higher than the first resolution. In this example, the drive control unit 3103 converts into 1-bit CMYK image data having resolution of 4800 dpi.

Furthermore, the drive control unit 3103 modulates the image data to a clock signal that indicates the light emission timing for a pixel, to generate an independent modulation signal for each color. The drive control unit 3103 drives the light sources 2200a, 2200b, 2200c, 2200d according to the modulation signal corresponding to each color to emit light.

Moreover, the drive control unit 3103 is an integrated circuit (IC) that is formed into one chip and is arranged near the light sources 2200a, 2200b, 2200c, 2200d as an example. The image processing unit 3102 and the interface unit 3101 are arranged at positions farther than the light sources 2200a, 2200b, 2200c, 2200d with respect to the drive control unit 3103. The image-processing unit 3102 and the drive control unit 3103 are connected by a cable 3104 therebetween.

The optical scanning device 2010 having such a configuration can make the light sources 2200a, 2200b, 2200c, 2200d emit light according to image data to form a latent image.

Figure 9:
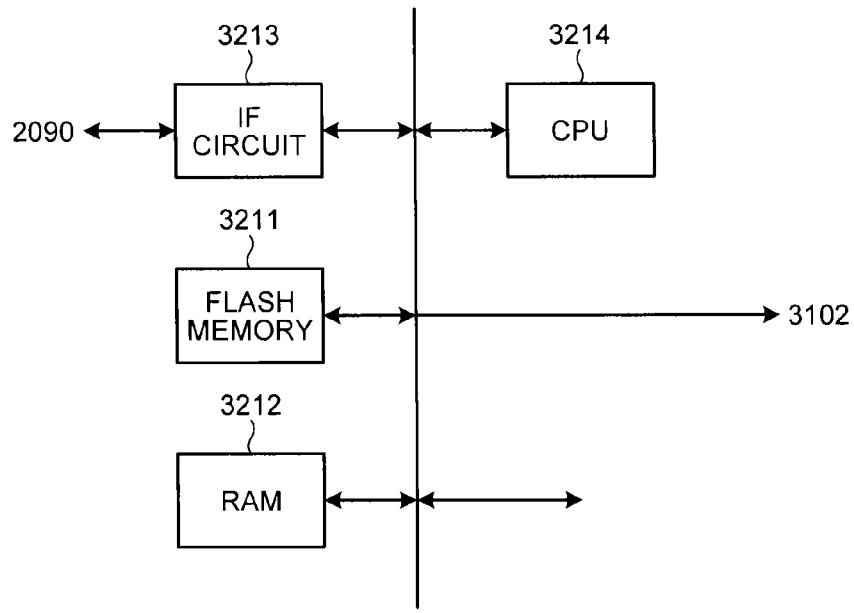
FIG. 9 is a configuration diagram of an interface unit 3101.

FIG. 9 is a configuration diagram of the interface unit 3101. The interface unit 3101 includes a flash memory 3211, a RAM 3212, an interface (IF) circuit 3213, and a CPU 3214 as an example. The flash memory 3211, the RAM 3212, the IF circuit 3213, and the CPU 3214 are connected through a bus with each other.

In the flash memory 3211, programs that are executed by the CPU 3214 and various kinds of data that is required for execution of the programs by the CPU 3214 are stored. The RAM 3212 is a memory area for operation when the CPU 3214 executes programs. The IF circuit 3213 interactively communicates with the printer control device 2090.

The CPU 3210 operates according to a program stored in the flash memory 3211, and controls the entire optical scanning device 2010. The interface unit 3101 having such a configuration transfers image data (RGB, 1200 dpi, 8 bits) that has been transmitted from the printer control device 2090 to the image processing unit 3102.

Figure 10:
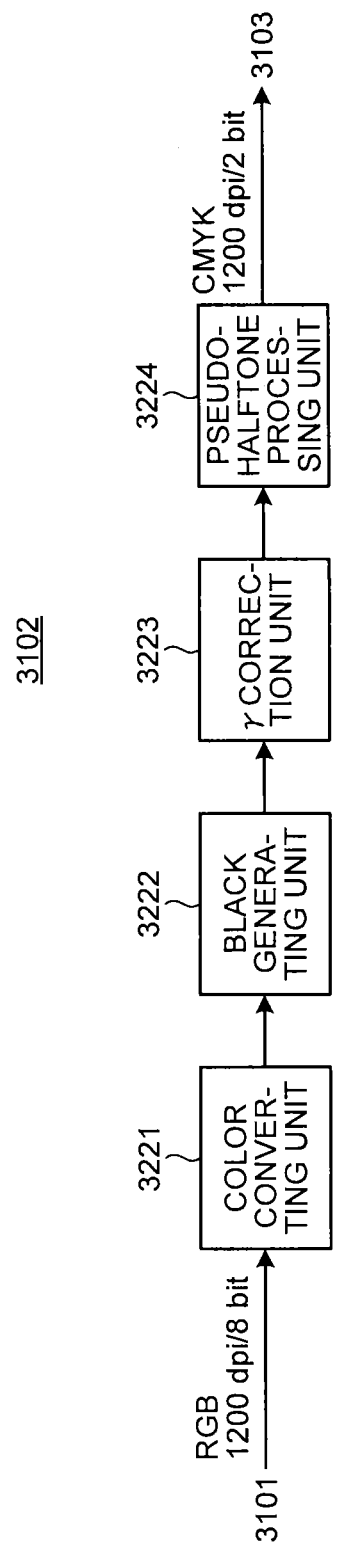
FIG. 10 is a configuration diagram of an image processing unit 3102.

FIG. 10 is a configuration diagram of the image processing unit 3102. The image processing unit 3102 includes a color converting unit 3221, a black generating unit 3222, a γ correction unit 3223, and a pseudo-halftone processing unit 3224.

The color converting unit 3221 converts 8-bit RGB image data into 8-bit CMY image data. The black generating unit 3222 generates black components from the CMY image data that has been generated by the color converting unit 3221, to generate CMYK image data. The γ correction unit 3223 performs linear conversion on levels of each color using a table and the like.

The pseudo-halftone processing unit 3224 receives 8-bit image data (input image data) from the γ correction unit 3223. The pseudo-halftone processing unit 3224 reduces the number of tones of the received 8-bit image data to output 2-bit image data. The pseudo-halftone processing unit 3224 reduces the number of tones of the received 8-bit image data to 2 bits, for example, by performing a halftone processing by dithering, error diffusion processing, and the like.

The image processing unit 3102 as above outputs 2-bit CMYK image data of the first resolution (for example, 1200 dpi) to the drive control unit 3103. The image processing unit 3102 may be implemented by hardware partially or entirely, or may be implemented by executing a software program by the CPU.

Figure 11:
FIG. 11 is a diagram showing an example of a parallel line pattern that is generated by a pseudo-halftone processing unit 3224.

FIG. 11 is a diagram showing an example of a parallel line pattern that is generated by the pseudo-halftone processing unit 3224. The pseudo-halftone processing unit 3224 performs parallel line dithering as one of the halftone processing to reduce the number of tones. That is, the pseudo-halftone processing unit 3224 converts a region of pixels having the same pixel value in the received 8-bit image data into a parallel line pattern that is formed with multiple parallel lines oblique relative to the direction of arrangement of pixels, and thereby express the concentration by an area ratio.

In this case, the pseudo-halftone processing unit 3224 converts a region of pixels having the same pixel value into a parallel line pattern that is formed with multiple lines at an area ratio according to the pixel value. Thus, the pseudo-halftone processing unit 3224 can generate image data in which the concentration of the original image area is expressed by the area ratio.

The pseudo-halftone processing unit 3224 generates a parallel line pattern that is formed with multiple lines of the predetermined number (number of lines) per unit length. In this case, the pseudo-halftone processing unit 3224 changes the width of each line according to the original pixel value. Specifically, the pseudo-halftone processing unit 3224 makes the width of lines smaller as a pixel value is smaller, and makes the width of lines larger as a pixel is larger, as shown in FIG. 11. Thus, the pseudo-halftone processing unit 3224 can form lines at an area ratio according to a pixel value.

Alternatively, the pseudo-halftone processing unit 3224 may change the number of lines according to a set value. Moreover, the pseudo-halftone processing unit 3224 sets an angle (screen angle) of lines that form a parallel line pattern relative to the direction of arrangement of pixels to an angle according to a set value.

Moreover, the pseudo-halftone processing unit 3224 generates a parallel line pattern in which lines are drawn in binary, as an example. In this case, the pseudo-halftone processing unit 3224 uses a black value (value corresponding to 100% intensity of light emitted from the light source 2200) for pixels forming the lines, and a white value (value corresponding to 0% intensity of light emitted from the light source 2200) for pixels of a portion other than the lines.

Moreover, the pseudo-halftone processing unit 3224 may generate a parallel line pattern in which lines are drawn in ternary or more, as an example. In this case, the pseudo-halftone processing unit 3224 uses a black value (value corresponding to 100% intensity of light emitted from the light source 2200) for pixels forming a center portion of the lines, an intermediate value (for example, value corresponding to 50% intensity of light emitted from the light source 2200) for pixels forming a part of edges of the lines, and a white value (value corresponding to 0% intensity of light emitted from the light source 2200) for pixels forming a portion other than the lines.

Figure 12:
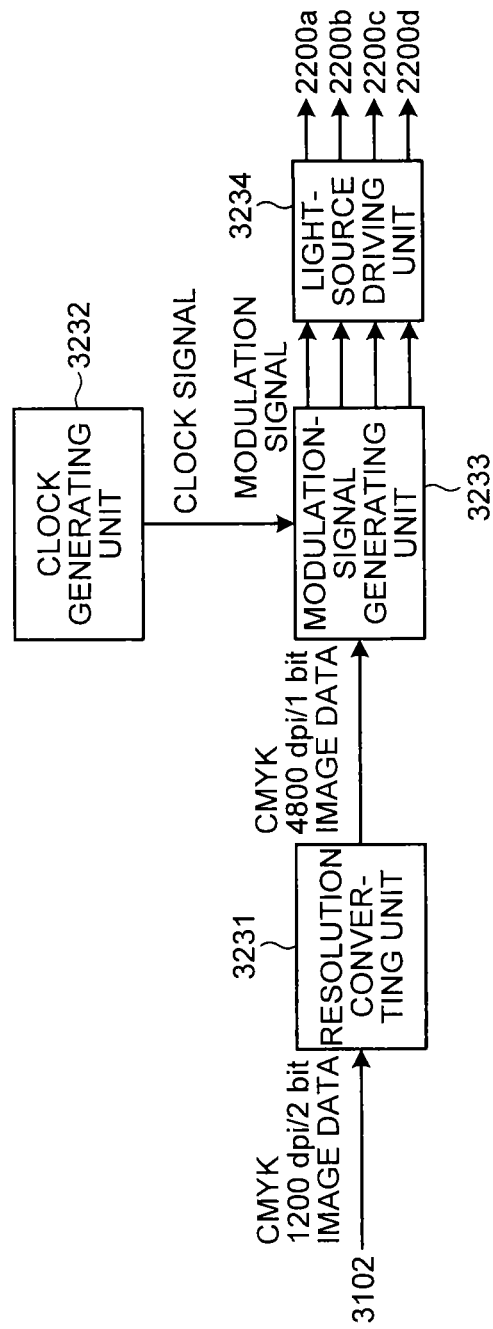
FIG. 12 is a configuration diagram of a drive control unit 3103.

FIG. 12 is a configuration diagram of the drive control unit 3103. The drive control unit 3103 includes a resolution converting unit 3231, a clock generating unit 3232, a modulation-signal generating unit 3233, and a light-source driving unit 3234.

The resolution converting unit 3231 acquires image data of the first resolution from the image processing unit 3102, and converts the image data into image data of the second resolution that is higher than the first resolution. In this example, the resolution converting unit 3231 converts 2-bit CMYK image data of 1200 dpi into 1-bit CMYK image data of 4800 dpi, and also reduces the number of tones at the same time with the conversion of resolution. As long as the processing to convert image data of resolution N (N is a positive integer) into image data of resolution m×N (m is a positive integer equal to or larger than 2) is performed, the resolution converting unit 3231 may perform conversion into image data of any tone.

Furthermore, the resolution converting unit 3231 performs smoothing on each of edges of lines in a parallel line pattern in the image data of the first resolution. The edges of lines signify side ends of a strip-shaped line. Smoothing edges is to make the shapes of the side ends smooth along the direction of extension of lines. The resolution converting unit 3231 outputs the image data of the second resolution in which each edge of the lines in the parallel line pattern are smoothed.

The clock generating unit 3232 generates a clock signal that indicates light emission timing for a pixel. The clock signal can be phase-modulated at the resolution of 1/8 clock, for example.

The modulation-signal generating unit 3233 modulates image data for each color according to the clock signal, and generates an independent modulation signal for each color. In this example, the modulation-signal generating unit 3233 generates a modulation signal for each color of C, M, Y, and K. Furthermore, the modulation-signal generating unit 3233 modulates image data into a clock signal for each color, in synchronization with write start timing based on the rotation position of the photosensitive drums 2030. The modulation-signal generating unit 3233 supplies the modulation signal independent for each color to the light-source driving unit 3234.

The light-source driving unit 3234 drives the corresponding light sources 2200a, 2200b, 2200c, 2200d according to each of the modulation signal independent for each color output from the modulation-signal generating unit 3233. Thereby, the light-source driving unit 3234 can make each of the light sources 2200a, 2200b, 2200c, 2200d emit light with the amount of light according to the modulation signal.

Figure 13:
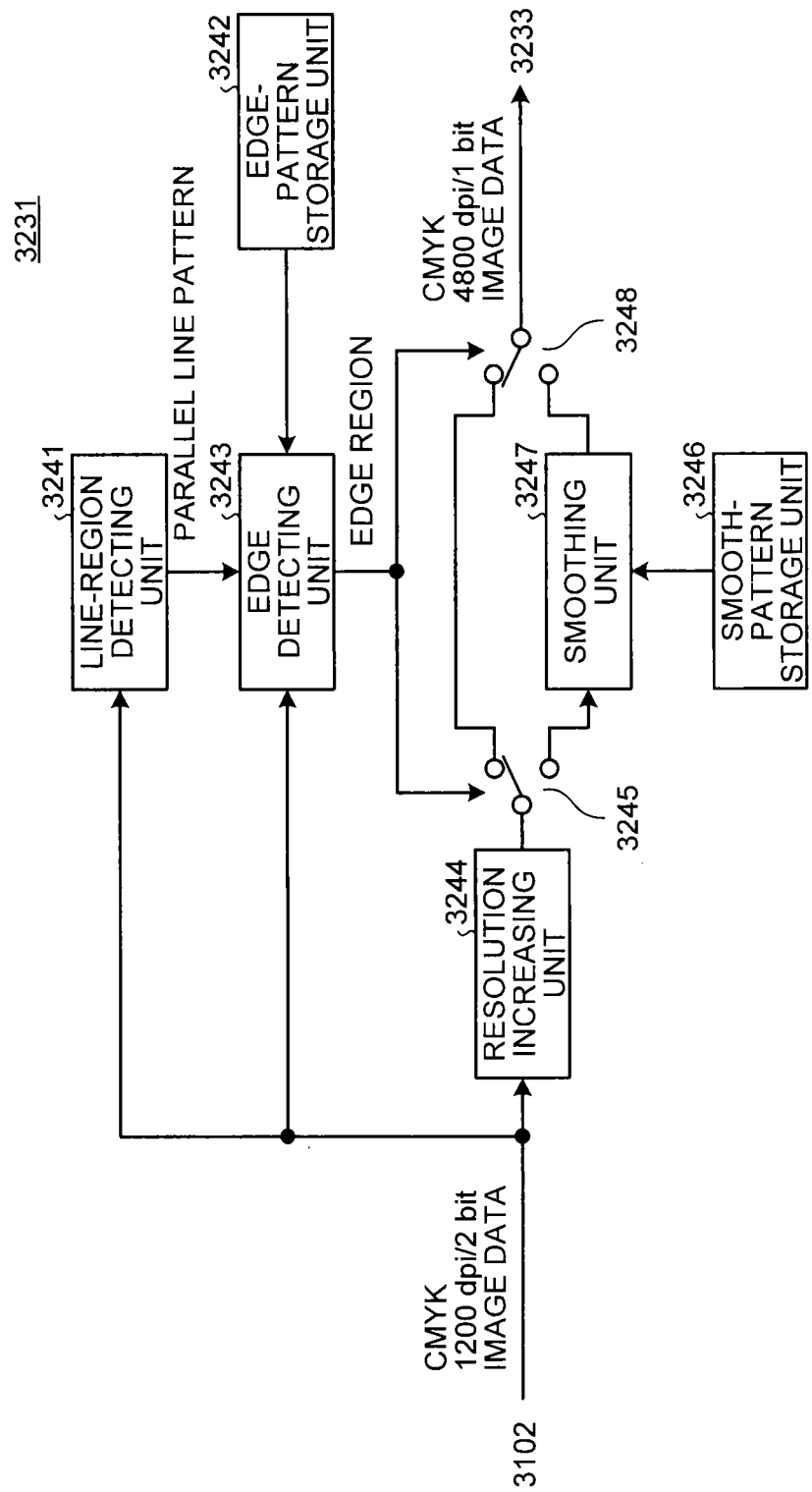
FIG. 13 is a configuration diagram of a resolution converting unit 3231.

FIG. 13 is a configuration diagram of the resolution converting unit 3231. The resolution converting unit 3231 has a line-region detecting unit 3241, an edge-pattern storage unit 3242, an edge detecting unit 3243, a resolution increasing unit 3244, a demultiplexer 3245, a smooth-pattern storage unit 3246, a smoothing unit 3247, and a multiplexer 3248.

The line-region detecting unit 3241 acquires image data of the first resolution from the image processing unit 3102, and detects a parallel line pattern in the image data of the first resolution. The line-region detecting unit 3241 then outputs a signal indicating a position of the detected parallel line pattern in the image data of the first resolution.

The line-region detecting unit 3241 detects a parallel line pattern by analyzing a pattern of an image, as an example. Moreover, the line-region detecting unit 3241 may detect a parallel line pattern by receiving data indicating a region at which the parallel line dithering has been performed, from the image processing unit 3102, as an example.

The edge-pattern storage unit 3242 stores edge patterns. An edge pattern is a partial image of the first resolution (1200 dpi) that expresses a stepped-shape of an edge of a line of the first resolution.

The edge detecting unit 3243 acquires image data of the first resolution from the image processing unit 3102, the signal indicating a position of a detected parallel line pattern from the line-region detecting unit 3241, and the edge pattern of the first resolution (1200 dpi) from the edge-pattern storage unit 3242.

The edge detecting unit 3243 detects an edge region that matches with the edge pattern of the first resolution from the parallel line pattern in the image data of the first resolution, by pattern matching. The edge detecting unit 3243 then outputs a signal indicating the position of the edge region.

The resolution increasing unit 3244 acquires the image data of the first resolution from the image processing unit 3102. The resolution increasing unit 3244 increases the resolution of the image data of the first resolution to convert into image data of the second resolution. In this case, the resolution increasing unit 3244 also reduces the number of tones by performing conversion from one dot at 1200 dpi expressed by a 2-bit tone into four dots in a horizontal direction at 4800 dpi expressed by a 1-bit tone, as an example.

The demultiplexer 3245 receives the image data of the second resolution from the resolution increasing unit 3244. The demultiplexer 3245 then switches an output destination of the image data of the second resolution according to the signal indicating the position of the edge region that has been output from the edge detecting unit 3243. Specifically, the demultiplexer 3245 outputs pixels corresponding to a portion other than the edge region detected by the edge detecting unit 3243 in the received image data of the first resolution to the multiplexer 3248 as it is. Moreover, the demultiplexer 3245 outputs the pixels corresponding to the edge region detected by the edge detecting unit 3243 in the received image data of the first resolution to the smoothing unit 3247 as it is.

The smooth-pattern storage unit 3246 stores smooth patterns. The smooth pattern is a partial image of the second resolution (4800 dpi) that expresses a smoothed shape obtained by smoothing the stepped-shape expressed by an edge pattern.

The smoothing unit 3247 arranges a smooth pattern stored in the smooth-pattern storage unit 3246 in a region corresponding to the edge region in the image data of the second resolution. That is, the smoothing unit 3247 replaces respective pixels included in the region corresponding to the edge region in the image data of the second resolution with pixels at corresponding positions included in the smooth pattern.

The multiplexer 3248 receives the pixels corresponding to the portion other than the edge region that are output from the resolution increasing unit 3244, and the pixels of the edge region that are output from the smoothing unit 3247. The multiplexer 3248 then multiplexes the pixels corresponding to the portion other than the edge region that are output from the resolution increasing unit 3244, and the pixels of the edge region that are output from the smoothing unit 3247 according to the signal indicating the position of the edge region output from the edge detecting unit 3243, to output them as one piece of image data of the second resolution.

The resolution converting unit 3231 having such a configuration can increase the resolution to convert image data of the first resolution into image data of second resolution, and can smooth edges (smoothing) of lines in a parallel line pattern.

The line-region detecting unit 3241 and the edge detecting unit 3243 acquire the image data of the first resolution, and detect the parallel line pattern region and the edge region.

Thus, the line-region detecting unit 3241 and the edge detecting unit 3243 can detect the parallel line pattern region and the edge region with small processing amount. Alternatively, the line-region detecting unit 3241 and the edge detecting unit 3243 may acquire image data of the second resolution output from the resolution increasing unit 3244 to detect the parallel line pattern region and the edge region.

Moreover, the smoothing unit 3247 may smooth edges by performing a spatial filter operation on the image data of the second resolution output from the resolution increasing unit 3244. Thereby, the resolution converting unit 3231 can smooth edges, without storing smooth patterns in advance.

Figure 14:
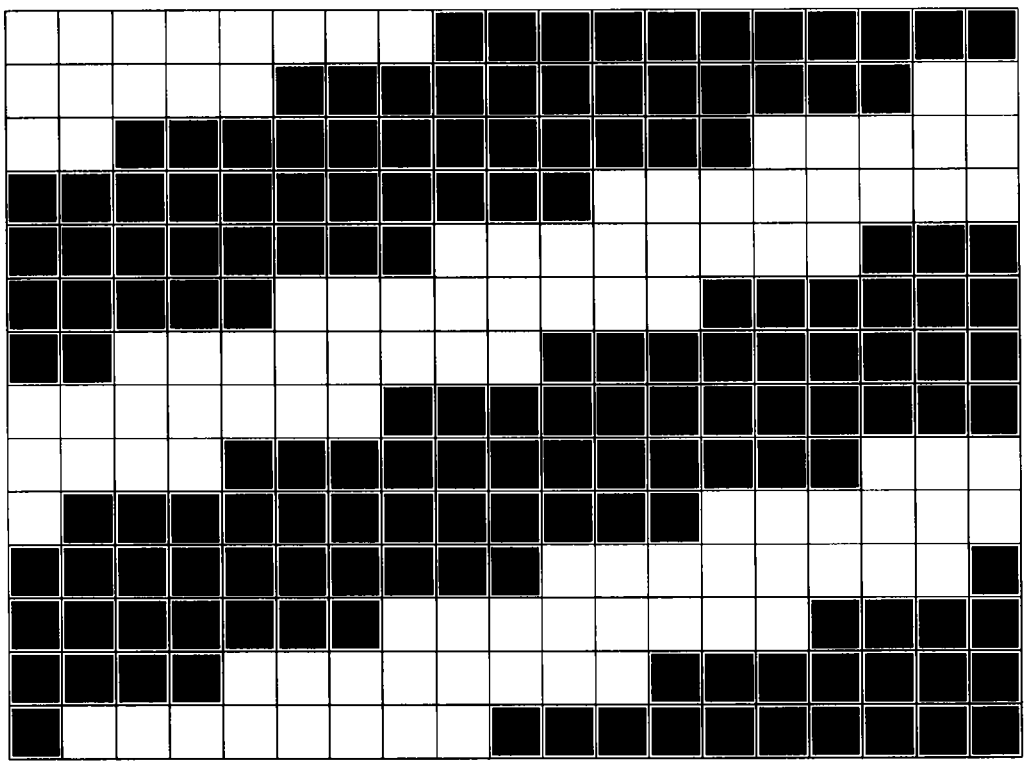
FIG. 14 is a diagram showing a part of a parallel line pattern in image data of 1200 dpi.

FIG. 14 is a diagram showing a part of a parallel line pattern in image data of 1200 dpi. In following diagrams showing image data, a position of each squared grid indicates a position of a pixel at corresponding resolution.

Lines forming a parallel line pattern are obliquely arranged relative to a direction of arrangement of pixels. Therefore, an edge of each line has a stepped-shape that varies in width by one pixel distance or more of the first resolution (1200 dpi) as shown in FIG. 14.

Figure 15:
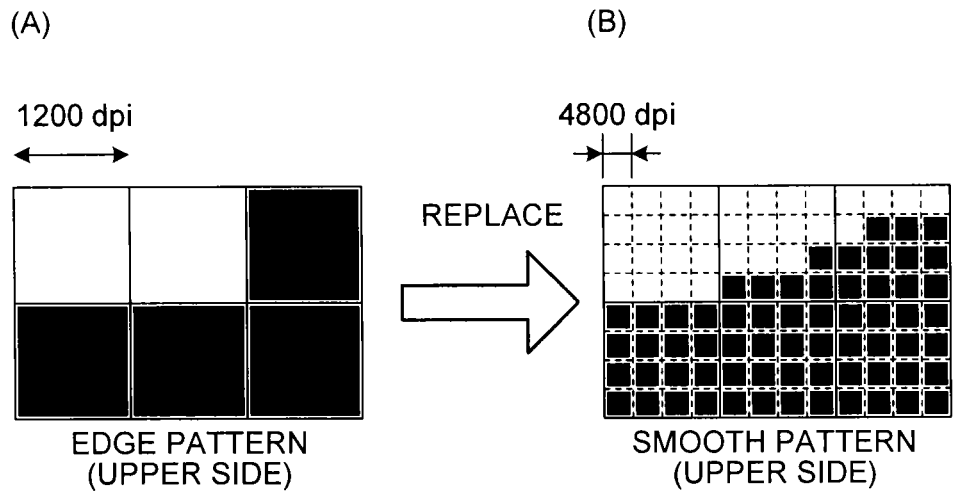
FIG. 15 is a diagram showing an example of an edge pattern and a smooth pattern to detect and smooth an upper edge of a line shown in FIG. 14.

FIG. 15 is a diagram showing an example of an edge pattern and a smooth pattern to detect and smooth an upper edge of a line shown in FIG. 14. Furthermore, FIG. 16 is a diagram showing an example of an edge pattern and a smooth pattern to detect and smooth a lower edge of the line shown in FIG. 14.

Figure 16:
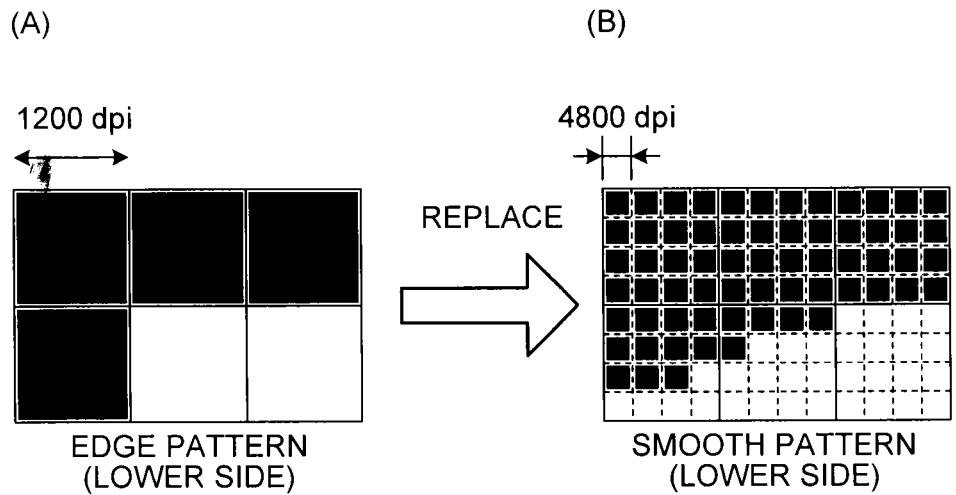
FIG. 16 is a diagram showing an example of an edge pattern and a smooth pattern to detect and smooth a lower edge of the line shown in FIG. 14.

The edge-pattern storage unit 3242 stores the partial image of the first resolution (1200 dpi) expressing a stepped-shape at an upper (or right) edge and a lower (or left) edge of a line as shown in FIG. 15(*a*) and FIG. 16(*a*), as an edge pattern. The edge detecting unit 3243 detects a region that matches with such an edge pattern as an edge region from a parallel line pattern as shown in FIG. 14.

For example, edge patterns are registered by a user in advance. Moreover, edge patterns may be of any size. For example, although the edge pattern is a partial image of 3×2 pixels in the examples shown in FIG. 15(*a*) and FIG. 16(*a*), the number of pixels may be larger than this. Furthermore, more than one kind of edge pattern may be registered for one parallel line pattern.

Moreover, an edge pattern is an image expressing a stepped-shape that varies according to the angle of lines. An edge pattern shows different stepped-shapes between when the angle of lines is 45 degrees relative to the direction of arrangement of pixels and when the angle of lines is 60 degrees relative to the direction of arrangement of pixels.

Moreover, the edge detecting unit 3243 may rotate an edge pattern showing the stepped-shape of an upper (or right) edge by 180 degrees to generate an edge pattern showing the stepped-shape of a lower (or left) edge of a line, or may perform the opposite. Thus, the edge-pattern storage unit 3242 can reduce the number of edge patterns to be stored.

The smooth-pattern storage unit 3246 stores a partial image of the second resolution (4800 dpi) expressing a shape that is obtained by smoothing a stepped-shape in a corresponding edge pattern as shown in FIG. 15(*b*) and FIG. 16(*b*), as a smooth pattern.

Smooth patterns are determined in advance corresponding to respective edge patterns. A smooth pattern is in a size corresponding to an edge pattern. For example, if an edge pattern is in a size of 3×2 pixels, a smooth pattern is to be a partial image in a size of 12×8 pixels, which is the size having resolution four times as high as that of the size of 3×2 pixels.

The smoothing unit 3247 arranges a smooth pattern in the region corresponding to the edge region that matches with the edge pattern in the image data of the second resolution. More specifically, the smoothing unit 3247 arranges the smooth pattern shown in FIG. 15(*b*) in the region corresponding to the edge region that matches with the edge pattern shown in FIG. 15(*a*). Moreover, the smoothing unit 3247 arranges the smooth pattern shown in FIG. 16(*b*) in the region corresponding to the edge region that matches with the edge pattern shown in FIG. 16(*a*). Thus, the smoothing unit 3247 can smooth each edge of lines in a parallel line pattern such that the distance between the edges opposed to each other in two adjacent lines is constant at any position on lines.

Moreover, in a smooth pattern, the number of pixels expressing a line portion is identical to the number of pixels expressing the line when the edges are not smoothed. Thus, the smoothing unit 3247 can smooth each edge of lines of a parallel line pattern so as to cause the light source to emit light having the same energy as the energy of light that is emitted from the light source based on the image data that has been converted into data of the second resolution without smoothing the edges.

Figure 17:
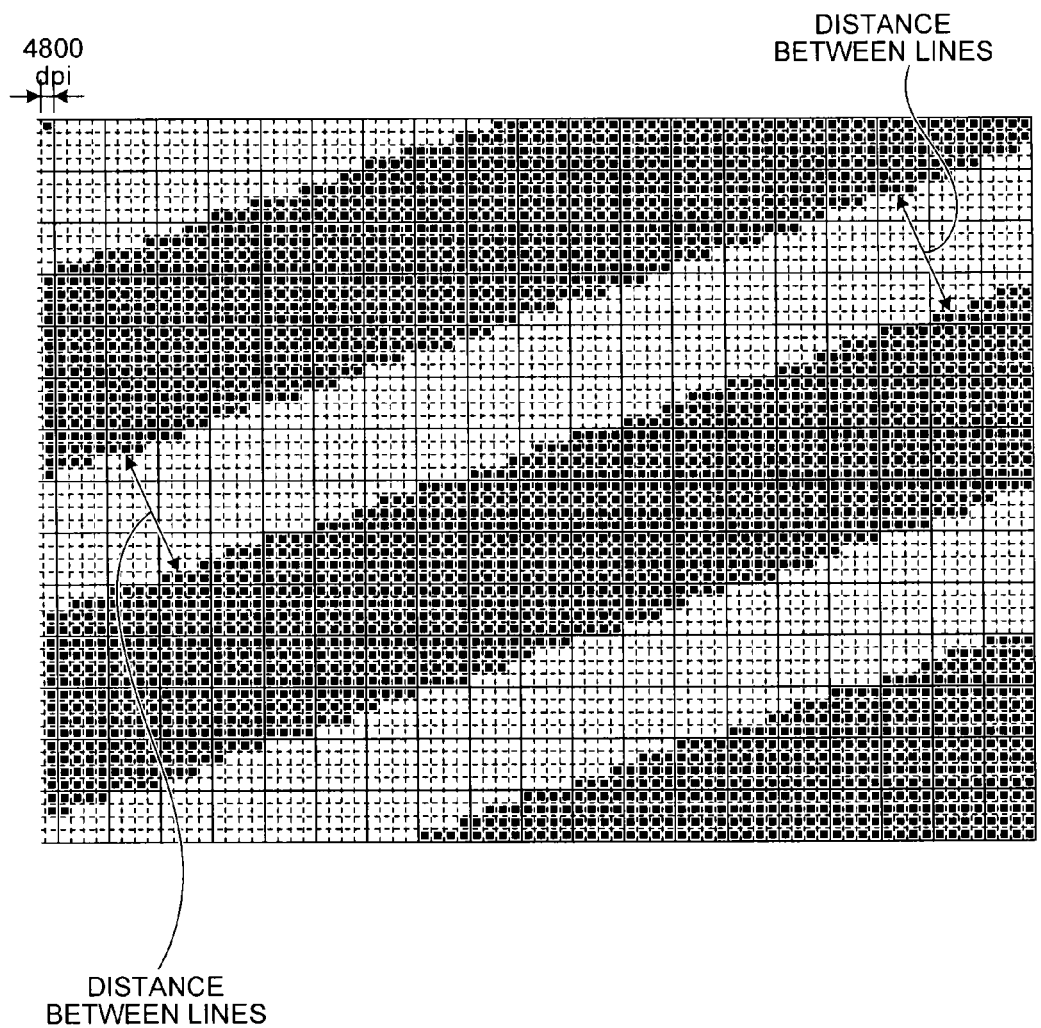
FIG. 17 is a diagram showing a part of a parallel line pattern in image data of 4800 dpi after edges of the lines shown in FIG. 14 have been smoothed.

FIG. 17 is a diagram showing a part of a parallel line pattern in image data of 4800 dpi after edges of the lines shown in FIG. 14 are smoothed. As shown in FIG. 17, the resolution converting unit 3231 can convert a parallel line pattern into higher resolution data having the second resolution (4800 dpi), and can smooth each edge of lines drawn obliquely relative to the direction of arrangement of pixels. Thus, the resolution converting unit 3231 can make the edge of each line to vary smoothly by an interval of a pixel of the second resolution (4800 dpi).

As described above, the color printer 2000 according to the present embodiment performs conversion from the first resolution (1200 dpi) to the second resolution (4800 dpi) in the drive control unit 3103. Thus, the color printer 2000 enables to suppress the data transfer amount from the image processing unit 3102 to the drive control unit 3103.

In the color printer 2000, each edge of lines forming a parallel line pattern is smoothed at the time of conversion from the first resolution to the second resolution. Thus, in the color printer 2000, intervals between lines in electrostatic latent images that are formed on the photosensitive drum 2030 corresponding to respective lines are approximately constant at any position in the direction of extension of the lines. Accordingly, influence from an electrostatic latent image of other lines is uniform, and therefore, it is possible to avoid toner from adhering non-uniformly or avoid toner scattering between lines. Thus, according to the color printer 2000, a parallel line pattern having uniform concentration can be printed.

(First Modification)

Next, a first modification of the embodiment is explained. The first modification has functions and components approximately identical to those of the embodiment explained referring to FIG. 1 through FIG. 17, and therefore, the identical symbols are given to units having approximately identical functions and components, and explanation thereof is omitted except differences.

Figure 18:
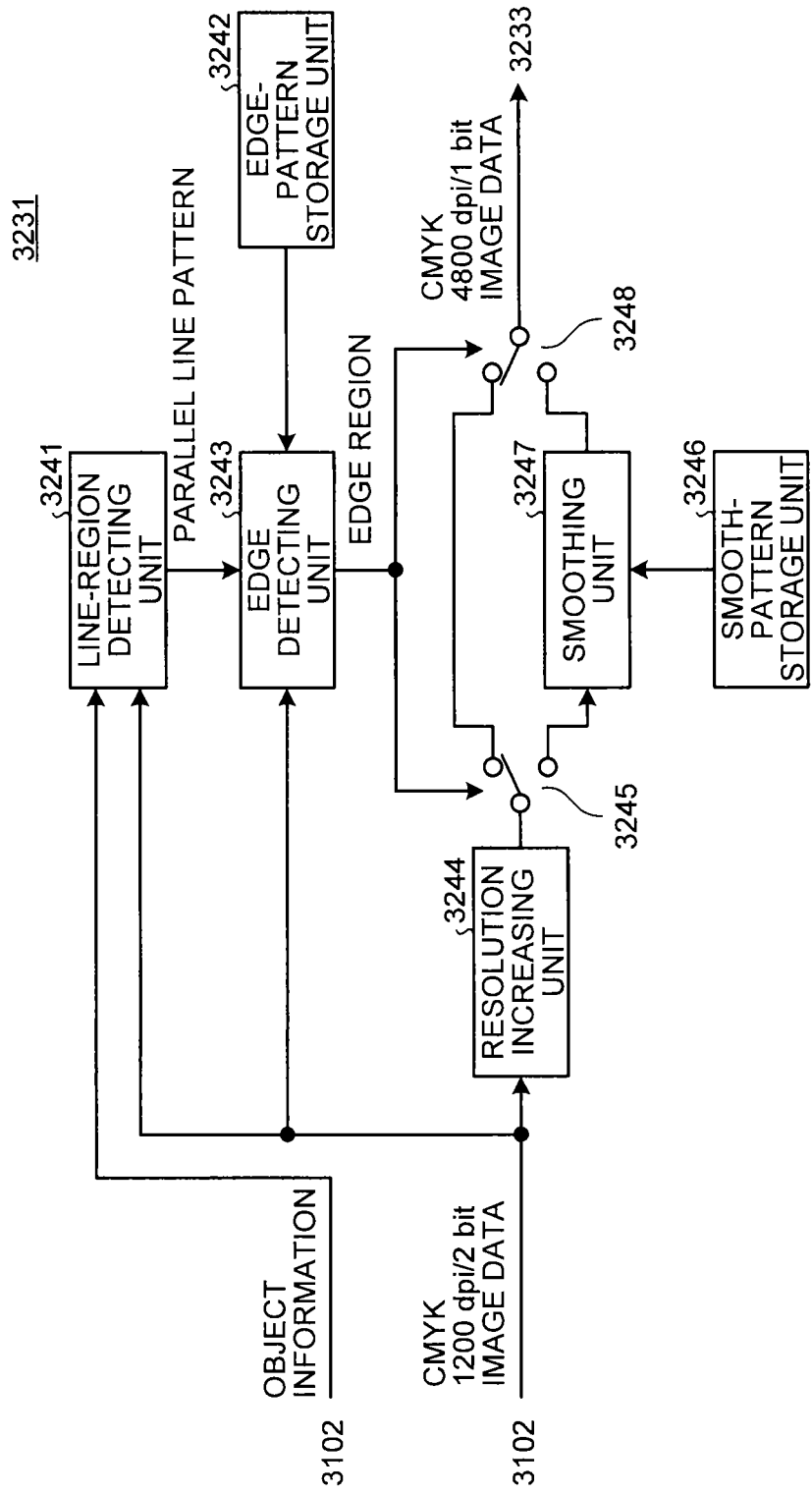
FIG. 18 is a configuration diagram of the resolution converting unit 3231 according to a first modification.

FIG. 18 is a configuration diagram of the resolution converting unit 3231 according to the first modification. The resolution converting unit 3231 according to the first modification receives object information from the image processing unit 3102 together with image data. The object information indicates the type of object being the source of the region (pixel) for each region (for example, for each pixel) of image data.

For example, if a corresponding pixel is a part of a character, an attribute indicating "character" is indicated in the object information. Moreover, if a corresponding pixel is a part of a figure, an attribute indicating "figure" is indicated in the object information. Furthermore, if a corresponding pixel is a part of a photograph, an attribute indicating "photograph" is indicated in the object information.

The line-region detecting unit 3241 detects a parallel line pattern based on the received object information. For example, the line-region detecting unit 3241 performs processing of detecting a parallel line pattern on the region for which the attribute of "photograph" is indicated in the object information and for which the parallel line dithering is possibly performed. On the contrary, the line-region detecting unit 3241 does not perform processing of detecting a parallel line pattern on the region for which the attribute of "character" or "figure" is indicated in the object information, and that has no possibility that the parallel line dithering is performed. Thus, the line-region detecting unit 3241 can detect a parallel line pattern efficiently and accurately.

(Second Modification)

Next, a second modification of the embodiment is explained. The second modification has functions and components approximately identical to those of the embodiment explained referring to FIG. 1 through FIG. 17, and therefore, the identical symbols are given to units having approximately identical functions and components, and explanation thereof is omitted except differences.

Figure 19:
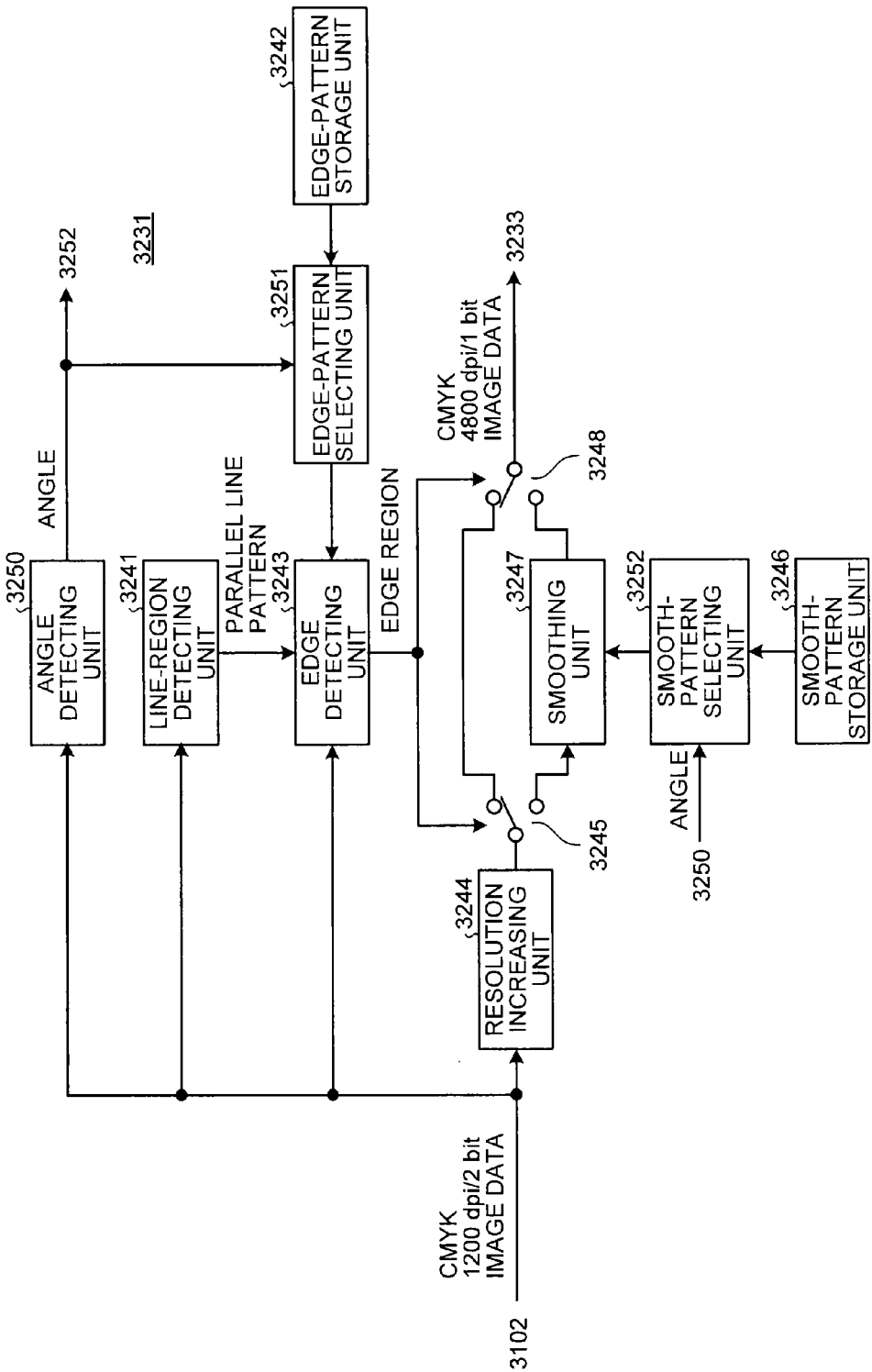
FIG. 19 is a configuration diagram of the resolution converting unit 3231 according to a second modification.

FIG. 19 is a configuration diagram of the resolution converting unit 3231 according to the second modification. The resolution converting unit 3231 according to the second modification further includes an angle detecting unit 3250, an edge-pattern selecting unit 3251, and a smooth-pattern selecting unit 3252.

The angle detecting unit 3250 detects the angle of lines, which form a parallel line pattern, relative to the direction of arrangement of pixels. The angle detecting unit 3250 detects the angle of lines by pattern matching, as an example. Moreover, the angle detecting unit 3250 may acquire angle data of the parallel line pattern from the image processing unit 3102 to detect the angle.

The edge-pattern storage unit 3242 stores various kinds of edge patterns that express stepped-shapes corresponding to respective angles of lines forming a parallel line pattern. As one example, the edge-pattern storage unit 3242 stores an edge pattern expressing a stepped-shape corresponding to an angle of 45 degrees, an edge pattern expressing a stepped-shape corresponding to an angle larger than 0 degrees and smaller than 45 degrees, and an edge pattern expressing a stepped-shape corresponding to an angle larger than 45 degrees and smaller than 90 degrees.

The edge-pattern selecting unit 3251 selects an edge pattern corresponding to the angle detected by the angle detecting unit 3250 from the edge-pattern storage unit 3242, to supply it to the edge detecting unit 3243. The edge detecting unit 3243 detects, in a parallel line pattern, an edge region that matches with the edge pattern selected by the edge-pattern selecting unit 3251, by pattern matching.

The smooth-pattern storage unit 3246 stores various kinds of smooth patterns that express smoothed stepped-shapes corresponding to respective angles of lines forming a parallel line pattern. As one example, the smooth-pattern storage unit 3246 stores a smooth pattern corresponding to an angle of 45 degrees, a smooth pattern corresponding to an angle larger than 0 degrees and smaller than 45 degrees, and a smooth pattern corresponding to an angle larger than 45 degrees and smaller than 90 degrees.

The smooth-pattern selecting unit 3252 selects a smooth pattern corresponding to the angle detected by the angle detecting unit 3250 from the smooth-pattern storage unit 3246, to supply it to the smoothing unit 3247. The smoothing unit 3247 arranges the smooth pattern that is selected by the smooth-pattern selecting unit 3252, in a region corresponding to the edge region in image data of the second resolution.

Figure 20:
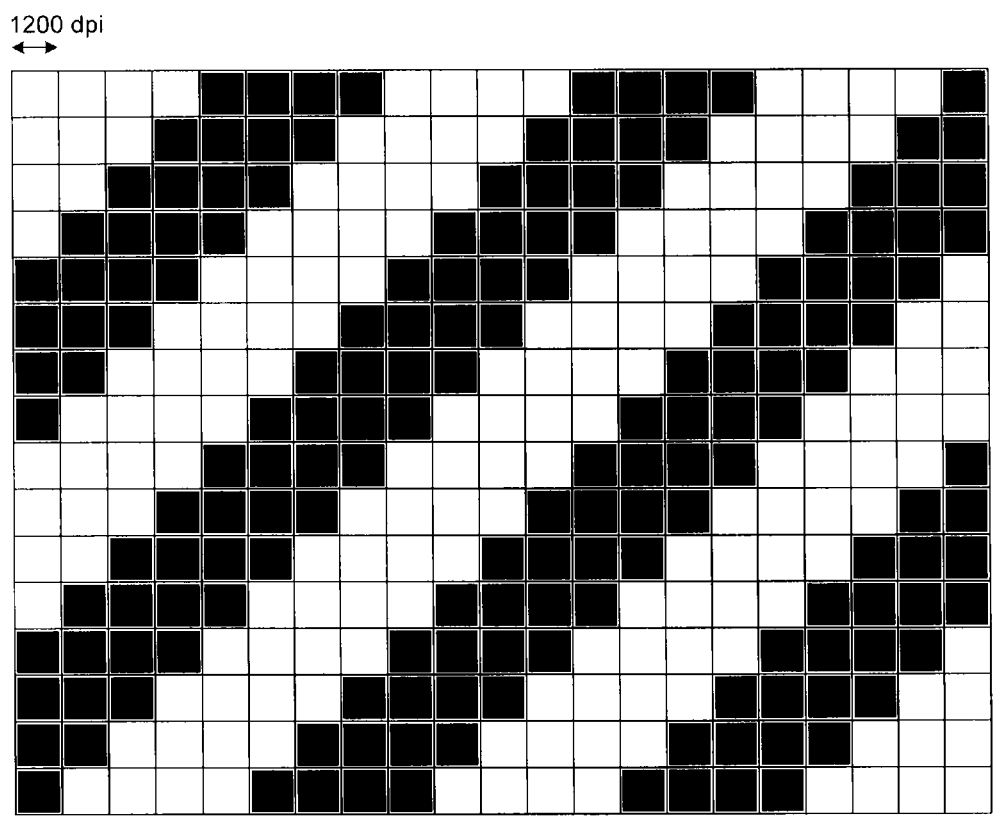
FIG. 20 is a diagram showing a part of a parallel line pattern in image data of 1200 dpi that is formed with 45-degree lines.
Figure 21:
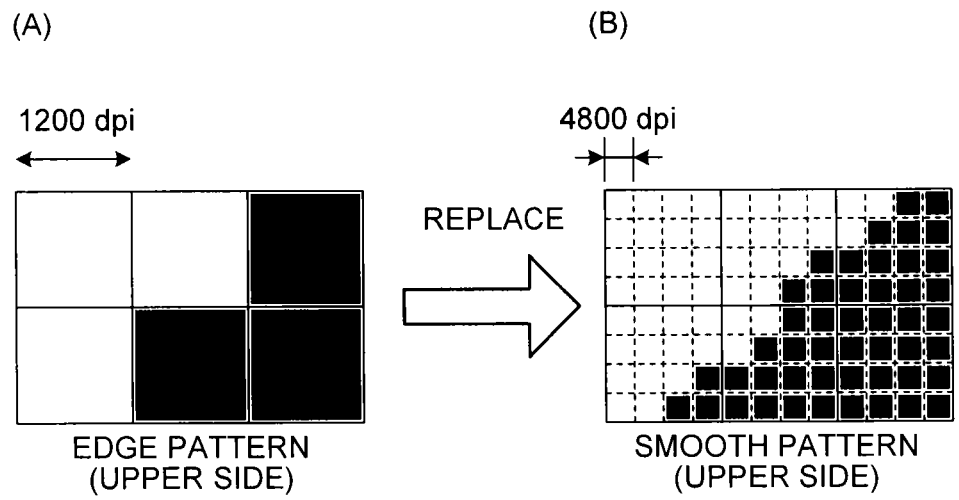
FIG. 21 is a diagram showing an example of an edge pattern and a smooth pattern to detect and smooth an upper edge of a line shown in FIG. 20.
Figure 22:
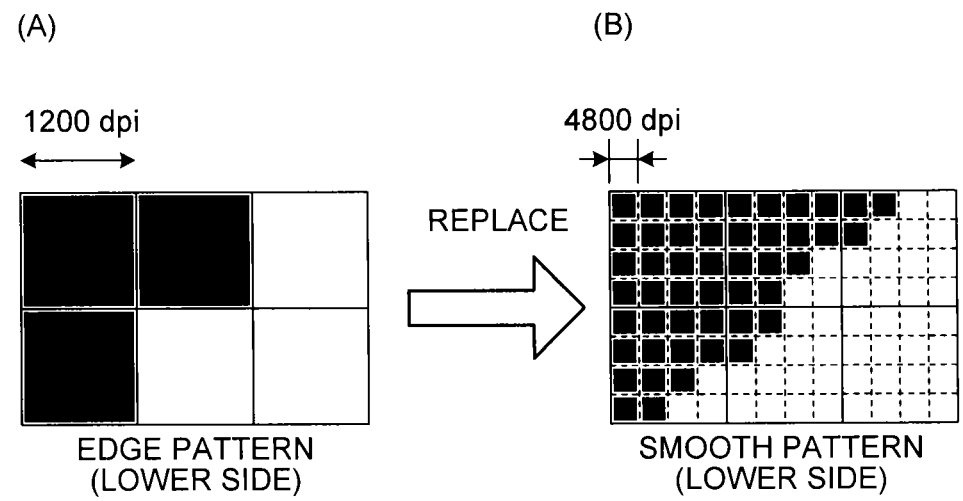
FIG. 22 is a diagram showing an example of an edge pattern and a smooth pattern to detect and smooth a lower edge of the line shown in FIG. 20.
Figure 23:
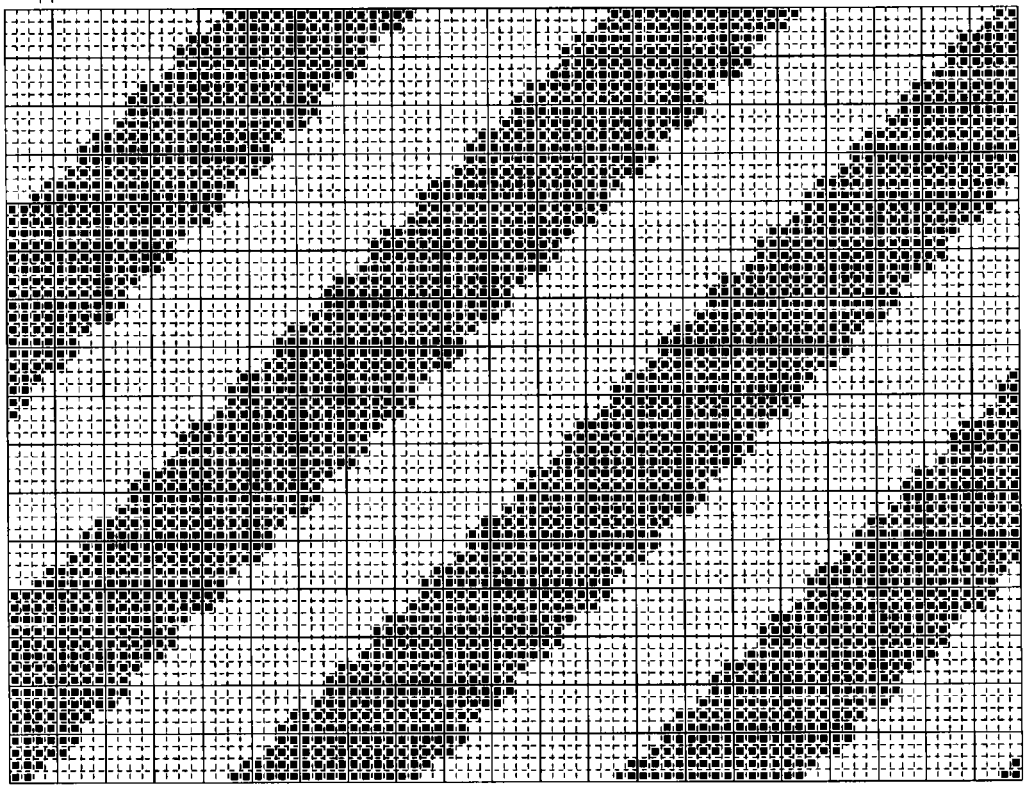
FIG. 23 is a diagram showing a part of a parallel line pattern in image data of 4800 dpi after edges of the lines shown in FIG. 20 have been smoothed.

FIG. 20 is a diagram showing a part of a parallel line pattern of 1200 dpi that is formed with 45-degree lines. FIG. 21 and FIG. 22 are diagrams showing an example of an edge pattern and a smooth pattern corresponding to the parallel line pattern that are formed with 45-degree lines. FIG. 23 is a diagram showing a part of a parallel line pattern of 4800 dpi after edges of the parallel line pattern that is formed with 45-degree lines are smoothed.

The pseudo-halftone processing unit 3224 generates any of a parallel line pattern formed with 45-degree lines, a parallel line pattern formed with approximately 30-degree lines, and a parallel line pattern formed with approximately 60 degree-lines, as an example.

In this case, the parallel line pattern formed with 45-degree lines takes, for example, a form as shown in FIG. 20. Moreover, the parallel line pattern formed with approximately 30-degree lines takes, for example, a form as shown in FIG. 14. The parallel line pattern formed with approximately 60-degree lines takes, for example, a form that is obtained by horizontally reversing FIG. 14 after 90-degree rotation thereof.

Furthermore, the edge-pattern storage unit 3242 stores partial images as shown in FIG. 21(*a*) and FIG. 22(*a*) as edge patterns corresponding to a 45-degree line, for example. The edge-pattern storage unit 3242 stores partial images as shown in FIG. 15(*a*) and FIG. 16(*a*) as edge patterns corresponding to an approximately 30-degree line. The edge-pattern storage unit 3242 stores partial images that are images shown in FIG. 15(*a*) and FIG. 16(*a*) horizontally reversed after 90-degree rotation thereof as edge patterns corresponding to an approximately 60-degree line.

Moreover, the smooth-pattern storage unit 3246 stores partial images as shown in FIG. 21(*b*) and FIG. 22(*b*) as smooth patterns corresponding to the 45-degree line. The smooth-pattern storage unit 3246 stores partial images as shown in FIG. 15(*b*) and FIG. 16(*b*) as smooth patterns corresponding to the approximately 30-degree line. The smooth-pattern storage unit 3246 stores partial images that are images shown in FIG. 15(*b*) and FIG. 16(*b*) horizontally reversed after 90-degree rotation thereof, as smooth patterns corresponding to the approximately 60-degree line.

By using such an edge pattern and a smooth pattern, the resolution converting unit 3231 can generate a parallel line pattern of 45-degree lines in which edges of the lines are smoothed as shown in FIG. 23. Moreover, the resolution converting unit 3231 can generate a parallel line pattern of approximately 30-degree lines in which edges of the lines are smoothed as shown in FIG. 17. Furthermore, the resolution converting unit 3231 can generate a parallel line pattern of approximately 60-degree lines in which edges of the lines are smoothed, as an image that is obtained by horizontally reversing the image shown in FIG. 17 after 90-degree rotation thereof.

The resolution converting unit 3231 as described can smooth edges appropriately according to the angle of lines in a parallel line pattern that is generated by the pseudo-halftone processing unit 3224.

(Third Modification)

Next, a third modification of the embodiment is explained. The third modification has functions and components approximately identical to those of the embodiment explained referring to FIG. 1 through FIG. 17, and therefore, the identical symbols are given to units having approximately identical functions and components, and explanation thereof is omitted except differences.

Figure 24:
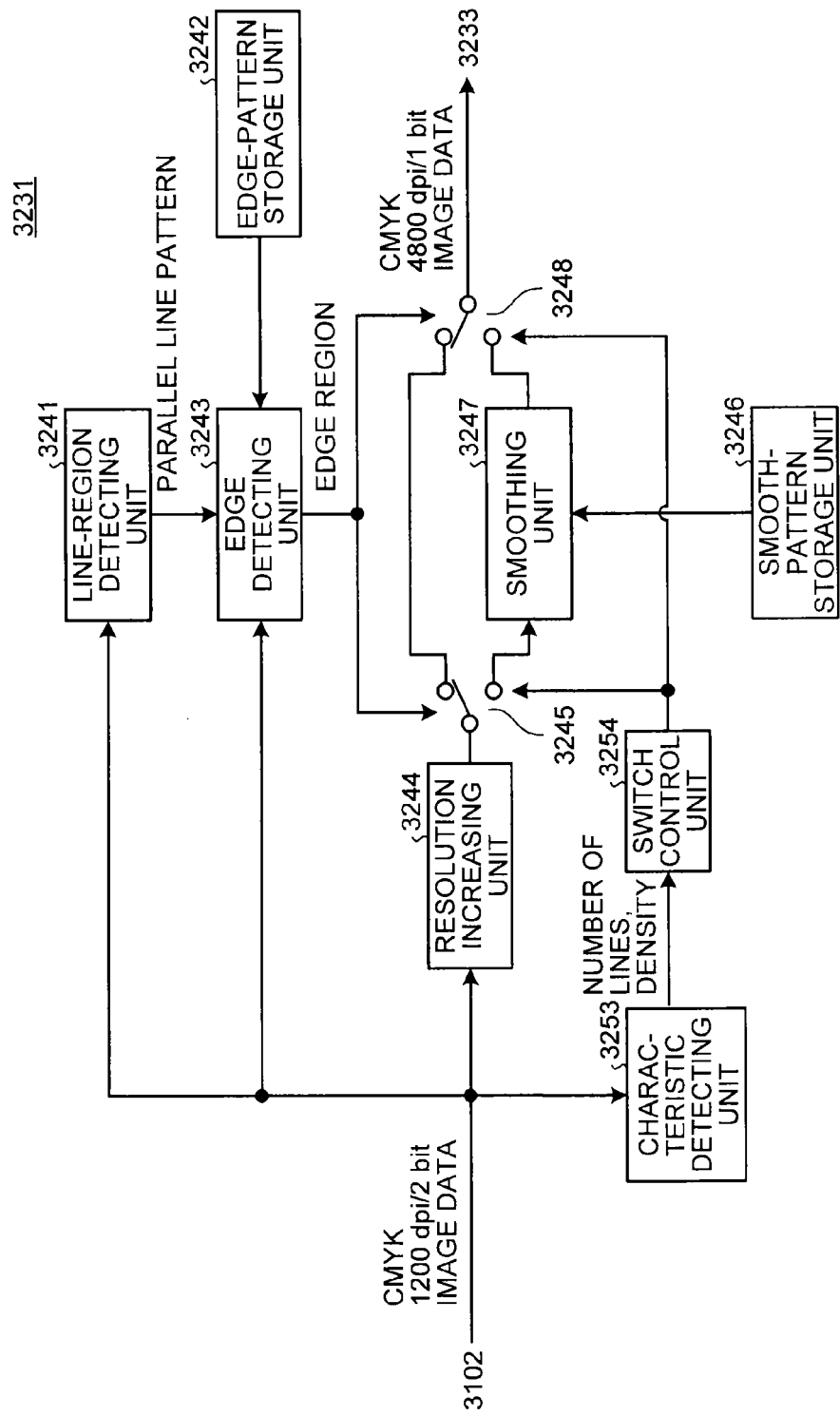
FIG. 24 is a configuration diagram of the resolution converting unit 3231 according to a third modification.

FIG. 24 is a configuration diagram of the resolution converting unit 3231 according to the third modification. The resolution converting unit 3231 according to the third modification further includes a characteristic detecting unit 3253 and a switch control unit 3254.

The characteristic detecting unit 3253 detects the number of lines per unit length or the density of lines forming a parallel line pattern. The characteristic detecting unit 3253 detects the number of lines per unit length or the density by pattern matching, as an example. Moreover, the characteristic detecting unit 3253 may acquire data of the number of lines per unit length and data of the density of a parallel line pattern from the image processing unit 3102, to detect the number of lines per unit length or the density.

The switch control unit 3254 cancels arrangement of a smooth pattern into the image data of the second resolution when the number of lines per unit length or the density detected by the characteristic detecting unit 3253 is lower than a predetermined value. That is, even if a parallel line pattern is included, the switch control unit 3254 only performs processing of converting into higher resolution by the resolution increasing unit 3244, and the smoothing processing is not performed.

When an adjacent line to a line is close, the electric field intensity and the like of an electrostatic latent image of the line formed on the photosensitive drum 2030 becomes unstable, receiving an influence from the electrostatic latent image of the adjacent line. However, when the adjacent line is separated by a certain distance or more, the influence from the electrostatic latent image of the adjacent line that is received by the electrostatic latent image of the line formed on the photosensitive drum 2030 is small. Accordingly, when the number of lines per unit length or the density of the lines is lower than the predetermined value, the concentration of the parallel line pattern does not become non-uniform, or toner scattering does not occur. Therefore, in the resolution converting unit 3231 according to the third modification, the amount of processing can be reduced by cancelling arrangement of a smooth pattern when the concentration is not non-uniform or when no toner scattering occurs.

(Fourth Modification)

Next, a fourth modification of the embodiment is explained. The fourth modification has functions and components approximately identical to those of the embodiment explained referring to FIG. 1 through FIG. 17, and therefore, the identical symbols are given to units having approximately identical functions and components, and explanation thereof is omitted except differences.

Figure 25:
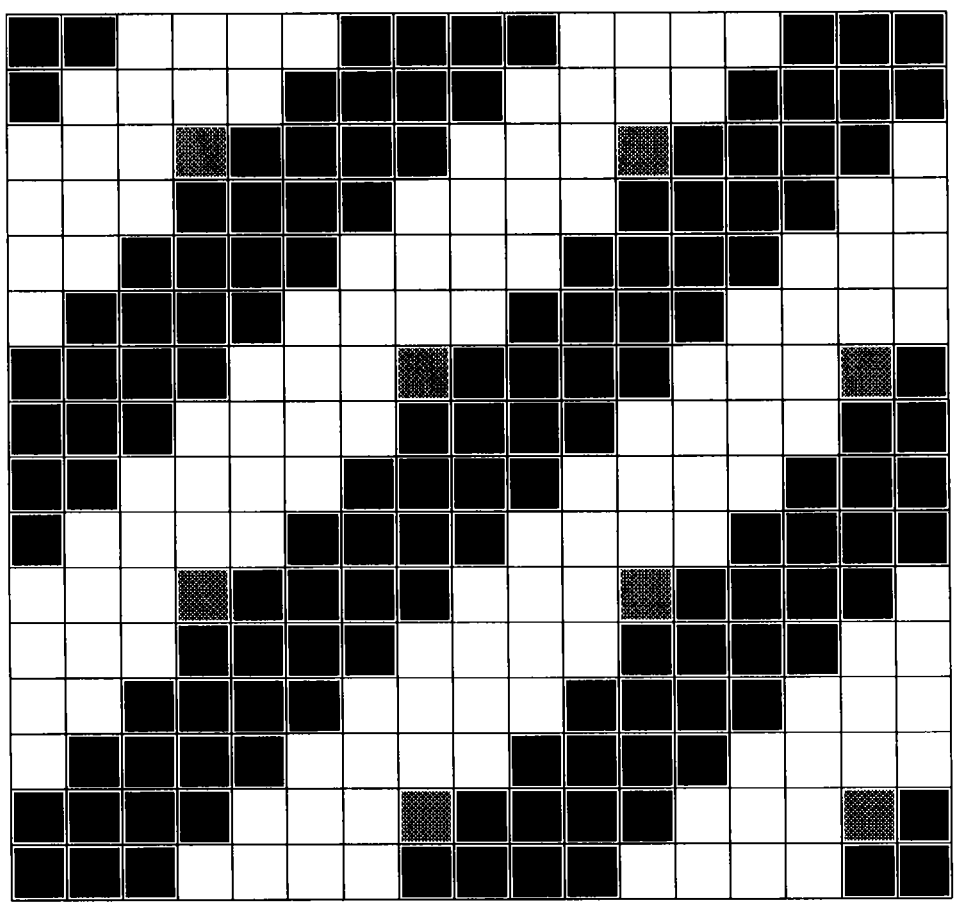
FIG. 25 is a diagram showing a part of a parallel line pattern of 1200 dpi expressed by ternary pixel values.
Figure 26:
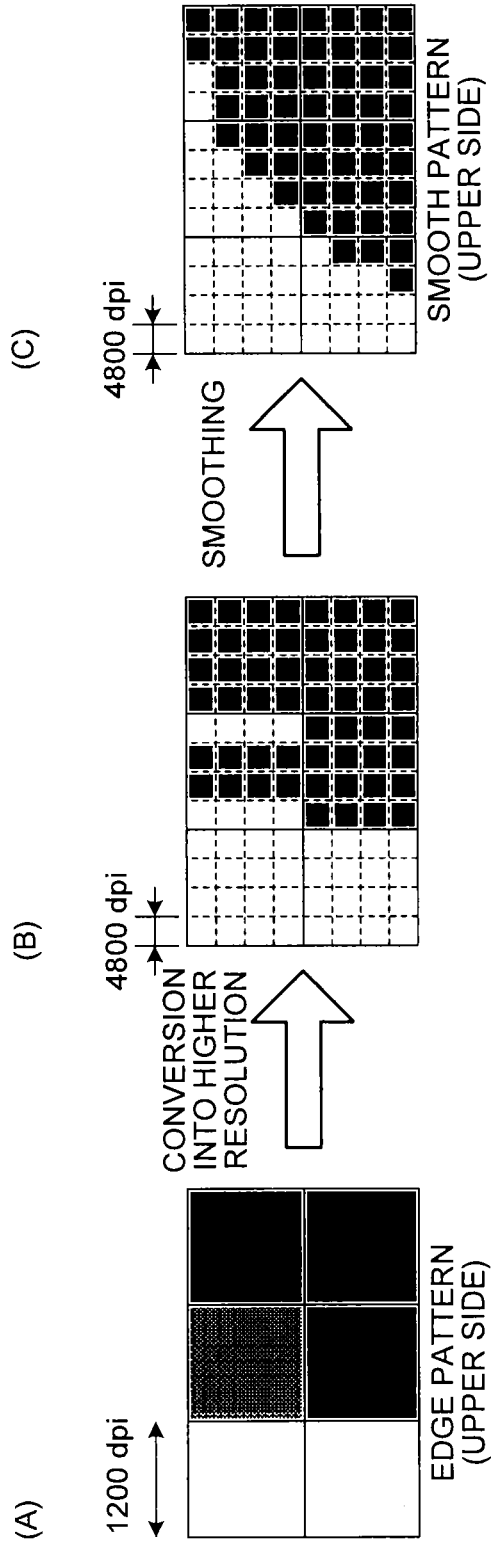
FIG. 26 is a diagram showing a first example of an edge pattern and a smooth pattern to detect and smooth an upper edge of a line shown in FIG. 25.
Figure 27:
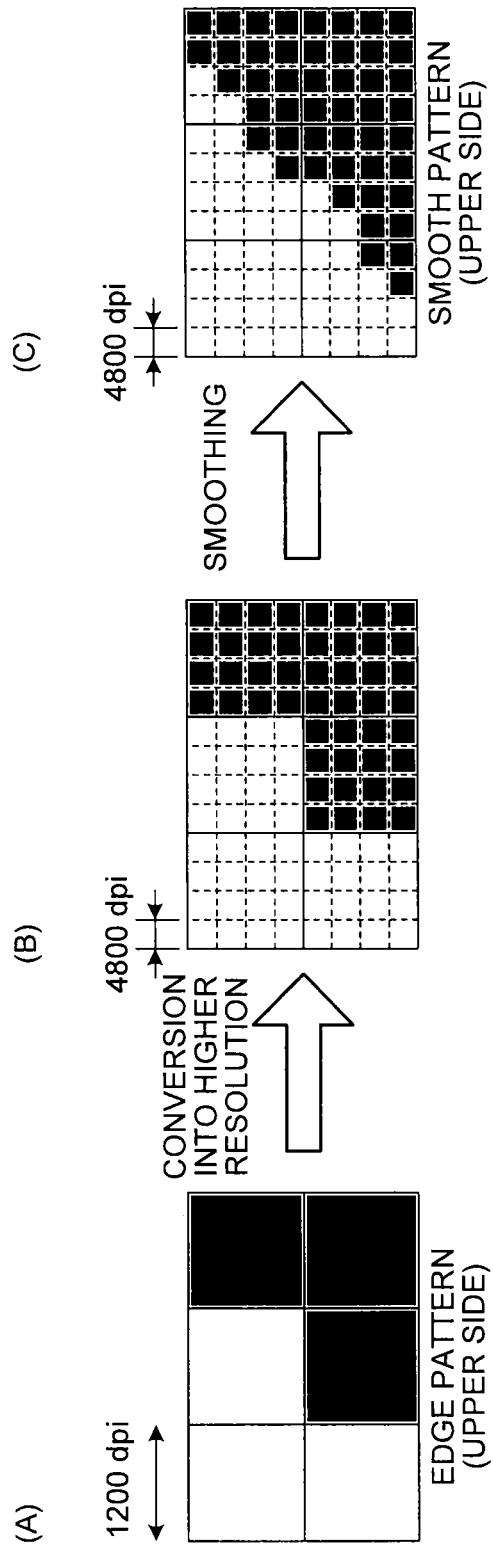
FIG. 27 is a diagram showing a second example of the edge pattern and the smooth pattern to detect and smooth an upper edge of the line shown in FIG. 25.
Figure 28:
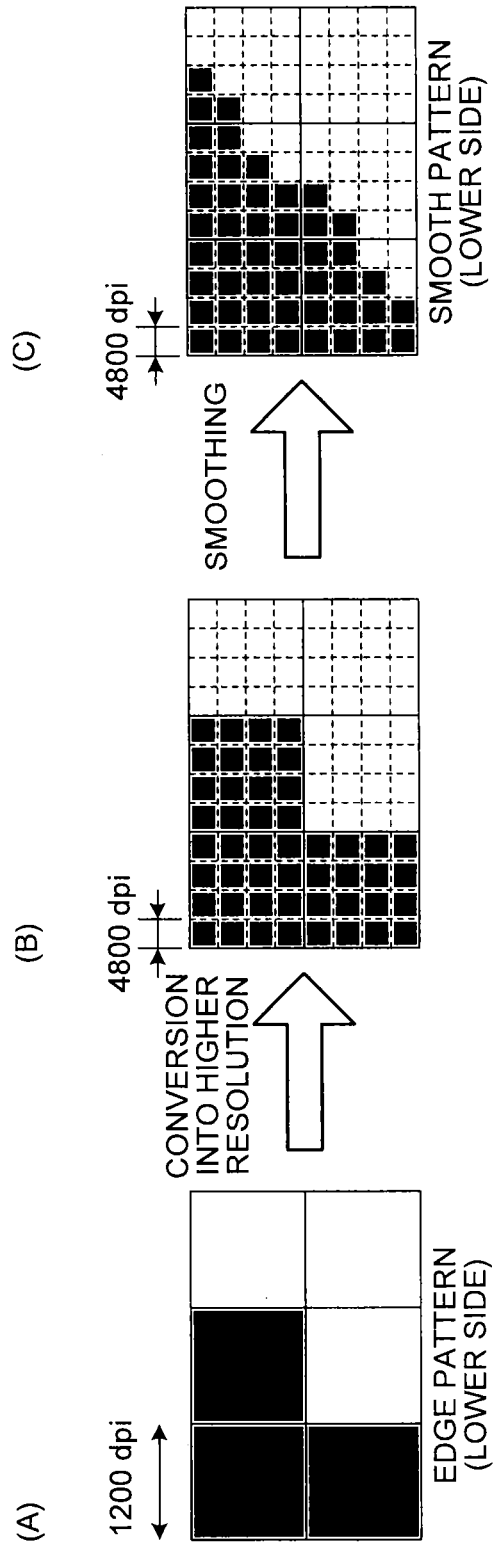
FIG. 28 is a diagram showing an example of an edge pattern and a smooth pattern to detect and smooth a lower edge of the line shown in FIG. 25.
Figure 29:
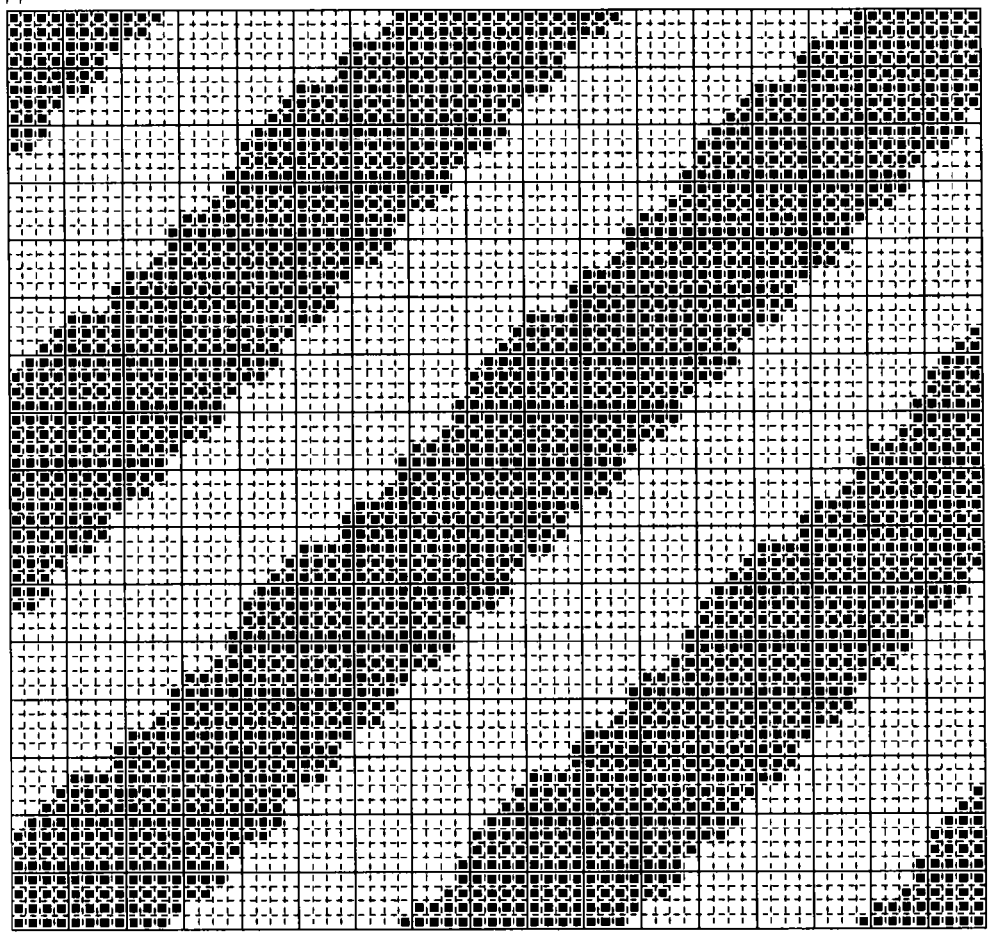
FIG. 29 is a diagram showing a part of a parallel line pattern in image data of 4800 dpi after edges of the lines shown in FIG. 25 have been smoothed.

FIG. 25 is a diagram showing a part of a parallel line pattern of 1200 dpi expressed by ternary pixel values. FIG. 26, FIG. 27, and FIG. 28 are diagrams showing an example of an edge pattern and a smooth pattern corresponding to the parallel line pattern expressed by ternary pixel values. FIG. 29 is a diagram showing a part of a parallel line pattern of 4800 dpi expressed by ternary pixel values after edges therein are smoothed.

The pseudo-halftone processing unit 3224 according to the fourth modification generates a parallel line pattern in which pixel values are expressed by ternary values. The pseudo-halftone processing unit 3224 generates a parallel line pattern of the first resolution (1200 dpi) expressed by ternary pixel values as shown in FIG. 25, for example.

In FIG. 25, a pixel expressed in white indicates that the luminance of light emitted from the light source 2200 is 0%, and a pixel expressed in black indicates that the luminance of light emitted from the light source 2200 is 100%, and a pixel expressed in cross-hatching indicates that the luminance of light emitted from the light source 2200 is 50%.

In such a case, the edge-pattern storage unit 3242 stores a partial image of the first resolution (1200 dpi) that expresses a stepped-shape by ternary pixel values as shown in FIG. 26($a$), FIG. 27($a$), and FIG. 28($a$), as an edge pattern.

Moreover, the smooth-pattern storage unit 3246 stores a partial image of the second resolution (4800 dpi) that expresses a shape by binary pixel values as shown in FIG. 26($c$), FIG. 27($c$), and FIG. 28($c$), as a smooth pattern.

The smooth pattern shown in FIG. 26($c$) is a partial image that is generated by converting a partial image shown in FIG. 26($a$) into a 1-bit partial image of the second resolution of 4800 dpi to increase resolution as shown in FIG. 26($b$), and then by smoothing the partial image so as to have equivalent energy. Moreover, the smooth pattern shown in FIG. 27($c$) is a partial image that is generated by converting a partial image shown in FIG. 27($a$) into a 1-bit partial image of the second resolution of 4800 dpi to increase resolution as shown in FIG. 27($b$), and then by smoothing the partial image so as to have equivalent energy. Furthermore, the smooth pattern shown in FIG. 28($c$) is a partial image that is generated by converting a partial image shown in FIG. 28($a$) into a 1-bit partial image of the second resolution of 4800 dpi to increase resolution as shown in FIG. 28($b$), and then by smoothing the partial image so as to have equivalent energy.

By using such an edge pattern and a smooth pattern, the resolution converting unit 3231 can smooth edges as shown in FIG. 29 for a parallel line pattern that expresses a stepped-shape by ternary pixel values.

As described, the resolution converting unit 3231 according to the fourth modification can appropriately smooth edges even if pixel values in a parallel line pattern that is generated by the pseudo-halftone processing unit 3224 are expressed by ternary or more values.

According to an embodiment, it is possible to make concentration of a parallel line pattern uniform without increasing a data transfer amount of image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image according to light emitted from a light source, the image forming apparatus comprising:
  circuitry configured to
    receive converted image data of a first resolution converted by replacing a region of pixels in an input image, the region of pixels having the same pixel value, with a parallel line pattern formed with parallel lines oblique to a pixel arrangement direction, width of the parallel lines in the parallel line pattern corresponding to the pixel value in the region of pixels,
    convert resolution of the converted image data of the first resolution, the converted image data including the parallel line pattern, to a second resolution that is higher than the first resolution and, after converting the resolution of the converted image data to the second resolution, smooth each edge of the lines forming the parallel line pattern, form the image by driving the light source based on the converted image data having the second resolution and including the parallel line pattern having smoothed edges, detect the parallel line pattern in the received converted image data, detect an edge region that matches with an edge pattern expressing a stepped-shape of an edge of a line of the first resolution from the parallel line pattern, convert image data of the first resolution into image data of the second resolution to increase resolution, and arrange, in a region corresponding to the edge region in the image data of the second resolution, a smooth pattern of the second resolution expressing a shape that is obtained by smoothing the stepped-shape.

2. The image forming apparatus according to claim 1, wherein the region of pixels having the same pixel value in the input image data is converted into the parallel line pattern formed with the lines having an area ratio according to the pixel value.

3. The image forming apparatus according to claim 1, wherein each edge of the lines in the parallel line pattern is smoothed such that a distance between edges opposed to each other in two adjacent lines is constant at any position on the lines.

4. The image forming apparatus according to claim 1, wherein each edge of the lines in the parallel line pattern is smoothed so as to cause the light source to emit light having energy equivalent to energy of light emitted from the light source according to the image data that has been converted into the second resolution without smoothing edges.

5. The image forming apparatus according to claim 1, wherein the circuitry detects the edge region by performing pattern matching on the parallel line pattern of the converted image data of the first resolution and the edge pattern of the first resolution.

6. The image forming apparatus according to claim 1, wherein the circuitry acquires, for each region of the image data of the first resolution, object information that indicates a type of object being a source of the region, and detects the parallel line pattern based on the acquired object information.

7. The image forming apparatus according to claim 1, further comprising circuitry configured to detect an angle of the lines relative to a direction of arrangement of pixels, wherein the circuitry detects the edge region that matches with the edge pattern expressing the stepped-shape corresponding to the angle from the parallel line pattern by pattern matching, and the circuitry arranges a smooth pattern of the second resolution expressing a shape that is obtained by smoothing the stepped-shape corresponding to the angle, in a region corresponding to the edge region in the image data of the second resolution.

8. The image forming apparatus according to claim 1, further comprising circuitry configured to detect a number of the lines per unit length or a density of the lines, and cancel arrangement of the smooth pattern into the image data of the second resolution when the number or the density is smaller than a predetermined value.

9. The image forming apparatus according to claim 1, wherein the circuitry detects the edge region by performing pattern matching on the parallel line pattern in the converted image data of the first resolution, in which pixel values are expressed by ternary or more values, and the edge pattern of the first resolution in which pixel values are expressed by ternary or more values.

10. The image forming apparatus according to claim 1, wherein the light source is a vertical cavity surface emitting laser.

11. An image forming method of forming an image according to light emitted from a light source, comprising:

receiving converted image data of a first resolution converted by replacing a region of pixels in an input image, the region of pixels having the same pixel value, with a parallel line pattern formed with parallel lines oblique to a pixel arrangement direction, width of the parallel lines in the parallel line pattern corresponding to the pixel value in the region of pixels;

converting resolution of the converted image data of the first resolution, the converted image data including the parallel line pattern, to a second resolution that is higher than the first resolution and, after converting the resolution of the converted image data to the second resolution, smoothing each edge of the lines forming the parallel line pattern;

forming the image by driving the light source based on the converted image data having the second resolution and including the parallel line pattern having smoothed edges, detecting the parallel line pattern in the received converted image data;

detecting an edge region that matches with an edge pattern expressing a stepped-shape of an edge of a line of the first resolution from the parallel line pattern;

converting image data of the first resolution into image data of the second resolution to increase resolution; and arranging, in a region corresponding to the edge region in the image data of the second resolution, a smooth pattern of the second resolution expressing a shape that is obtained by smoothing the stepped-shape.

* * * * *